United States Patent
Saigo et al.

(10) Patent No.: US 8,542,246 B2
(45) Date of Patent: Sep. 24, 2013

(54) COLOR CONVERSION DEVICE, COLOR CONVERSION TABLE AND COLOR CONVERSION METHOD

(75) Inventors: Katsuo Saigo, Hyogo (JP); Hiroshi Miyai, Hyogo (JP); Hisakazu Hitomi, Okayama (JP); Masanobu Inoe, Okayama (JP); Masahiro Kawashima, Osaka (JP); Akihiro Takeuchi, Nara (JP)

(73) Assignee: Panasonic Corporation, Osaka (JP)

( * ) Notice: Subject to any disclaimer, the term of this patent is extended or adjusted under 35 U.S.C. 154(b) by 487 days.

(21) Appl. No.: 12/921,867

(22) PCT Filed: Mar. 11, 2009

(86) PCT No.: PCT/JP2009/001099
§ 371 (c)(1),
(2), (4) Date: Sep. 10, 2010

(87) PCT Pub. No.: WO2009/113306
PCT Pub. Date: Sep. 17, 2009

(65) Prior Publication Data
US 2011/0012920 A1 Jan. 20, 2011

(30) Foreign Application Priority Data

Mar. 11, 2008 (JP) .................................. 2008-061880
Mar. 11, 2008 (JP) .................................. 2008-061895
Mar. 11, 2008 (JP) .................................. 2008-061897

(51) Int. Cl.
*G09G 5/00* (2006.01)
*G09G 5/02* (2006.01)
*G06K 9/00* (2006.01)
*G06K 9/40* (2006.01)
*G03F 3/08* (2006.01)
*H04N 1/46* (2006.01)
*H04N 1/60* (2006.01)
*H04N 1/62* (2006.01)
*G06T 11/00* (2006.01)

(52) U.S. Cl.
USPC ............ 345/592; 345/590; 345/591; 345/601; 345/603; 345/606; 348/659; 348/256; 348/557; 348/603; 348/630; 358/519; 358/520; 358/525; 382/166; 382/167; 382/254; 382/274; 382/276

(58) Field of Classification Search
USPC ................ 345/581, 589, 590, 591, 592–594, 345/597, 600–601, 603, 606, 611, 617–618, 345/549; 348/109, 179, 251–254, 256, 467, 348/552–553, 557–558, 560, 571, 577, 582, 348/599, 603, 612, 621, 630, 659, 708; 358/1.9, 358/3.23, 515–519, 520, 523–525, 448; 382/162, 166–167, 232, 237, 254, 274, 276, 382/300
See application file for complete search history.

(56) References Cited

U.S. PATENT DOCUMENTS 4,675,704 A  6/1987  Yamamoto
4,758,885 A  7/1988  Sasaki et al.
(Continued)

FOREIGN PATENT DOCUMENTS

EP  0 998 132  5/2000
EP  1 555 807  7/2005
(Continued)

OTHER PUBLICATIONS

Kevin E. Spaulding: "UltraColor: a new gamut-mapping strategy", Proceedings SPIE, vol. 2414, Jan. 1, 1995, pp. 61-68, XP55026110, ISSN: 0277-786X, DOI: 10 1117/12.206553 * the whole document *.

(Continued)

*Primary Examiner* — Wesner Sajous
(74) *Attorney, Agent, or Firm* — Wenderoth, Lind & Ponack, L.L.P.

(57) ABSTRACT

A color conversion device generates color data in a second color gamut based on first converted color data and input color data, which are obtained from input color data in a first color gamut, and outputs the color data in the second color gamut. The color conversion device includes a first color mapping unit which generates the first converted color data by mapping the input color data into the second color gamut; a color mixing unit which generates color data by mixing the first converted color data and second converted color data at a ratio corresponding to the first color gamut and the second color gamut; and a color data output unit which outputs the color data.

6 Claims, 37 Drawing Sheets

(56) References Cited

U.S. PATENT DOCUMENTS

| | | | |
|---|---|---|---|
| 4,959,711 A | 9/1990 | Hung et al. | |
| 5,065,234 A | 11/1991 | Hung et al. | |
| 5,933,252 A | 8/1999 | Emori et al. | |
| 6,204,939 B1* | 3/2001 | Lin et al. | 358/518 |
| 6,373,595 B1* | 4/2002 | Semba et al. | 358/1.9 |
| 6,400,843 B1* | 6/2002 | Shu et al. | 382/167 |
| 6,421,142 B1* | 7/2002 | Lin et al. | 358/1.9 |
| 6,437,792 B1 | 8/2002 | Ito et al. | |
| 6,532,081 B1 | 3/2003 | Cecchi et al. | |
| 6,611,356 B1 | 8/2003 | Shimizu et al. | |
| 7,177,465 B1* | 2/2007 | Takahira | 382/166 |
| 2001/0017627 A1* | 8/2001 | Marsden et al. | 345/501 |
| 2004/0061881 A1 | 4/2004 | Shimizu et al. | |
| 2005/0280851 A1* | 12/2005 | Kim et al. | 358/1.9 |
| 2006/0061784 A1 | 3/2006 | Sawada | |
| 2007/0041028 A1 | 2/2007 | Seko | |
| 2007/0058183 A1 | 3/2007 | Osaki et al. | |
| 2007/0296988 A1* | 12/2007 | Tsuji | 358/1.9 |
| 2008/0239348 A1* | 10/2008 | Kawai | 358/1.9 |
| 2009/0278867 A1* | 11/2009 | Brown et al. | 345/690 |
| 2010/0289835 A1* | 11/2010 | Holub | 345/690 |

FOREIGN PATENT DOCUMENTS

| | | |
|---|---|---|
| JP | 60-105376 | 6/1985 |
| JP | 61-288662 | 12/1986 |
| JP | 61-288690 | 12/1986 |
| JP | 63-195777 | 8/1988 |
| JP | 63-254889 | 10/1988 |
| JP | 03-158075 | 7/1991 |
| JP | 04-040072 | 2/1992 |
| JP | 06-225130 | 8/1994 |
| JP | 07-220067 | 8/1995 |
| JP | 11-177835 | 7/1999 |
| JP | 2000-134490 | 5/2000 |
| JP | 2000-278546 | 10/2000 |
| JP | 2003-153027 | 5/2003 |
| JP | 2003-283846 | 10/2003 |
| JP | 2005-284521 | 10/2005 |
| JP | 2006-094531 | 4/2006 |
| JP | 2007-053521 | 3/2007 |
| JP | 2007-074514 | 3/2007 |

OTHER PUBLICATIONS

Morovic J et al: "The Fundamentals of Gamut Mapping: A Survey", Journal of Imaging Science and Technology, Society of Imaging Science & Technology, Springfield, VA, US, vol. 45, No. 3 May 1, 2001, pp. 283-290, XP008017721, ISSN: 1062-3701 * the whole document *.

* cited by examiner

FIG. 7A

AdobeRGB data (20) | Yxy (30)

| R | G | B | Y | x | y |
|---|---|---|---|---|---|
| 10 | 255 | 10 | 62.7 | 0.210 | 0.709 |
| 35 | 254 | 35 | 62.7 | 0.214 | 0.694 |
| 50 | 253 | 50 | 62.7 | 0.219 | 0.675 |
| 60 | 252 | 60 | 62.7 | 0.224 | 0.660 |
| 135 | 237 | 135 | 62.6 | 0.270 | 0.488 |
| 180 | 220 | 180 | 62.7 | 0.298 | 0.382 |
| 200 | 210 | 200 | 62.7 | 0.309 | 0.341 |
| 207 | 206 | 207 | 62.8 | 0.313 | 0.328 |

FIG. 7B

Yxy to sRGB (22)

| R | G | B |
|---|---|---|
| 0 | 255 | 0 |
| 0 | 254 | 0 |
| 0 | 253 | 0 |
| 0 | 252 | 13 |
| 25 | 237 | 128 |
| 161 | 220 | 178 |
| 196 | 210 | 200 |
| 207 | 206 | 207 |

FIG. 7C

AdobeRGB to sRGB compression example (23) | Yxy (31)

| R | G | B | Y | x | y |
|---|---|---|---|---|---|
| 9 | 255 | 9 | 71.5 | 0.300 | 0.600 |
| 32 | 254 | 32 | 71.2 | 0.300 | 0.593 |
| 46 | 253 | 46 | 70.9 | 0.301 | 0.584 |
| 55 | 252 | 56 | 70.7 | 0.301 | 0.576 |
| 116 | 237 | 134 | 66.4 | 0.296 | 0.467 |
| 174 | 220 | 179 | 64.2 | 0.307 | 0.379 |
| 198 | 210 | 200 | 63.1 | 0.311 | 0.341 |
| 207 | 206 | 207 | 62.7 | 0.313 | 0.328 |

FIG. 10A sRGB data (20)

| R | G | B |
|---|---|---|
| 10 | 255 | 10 |
| 45 | 254 | 45 |
| 74 | 252 | 74 |
| 150 | 240 | 150 |
| 171 | 235 | 171 |
| 191 | 229 | 191 |
| 216 | 220 | 216 |
| 219 | 219 | 219 |

Yxy (30)

| Y | x | y |
|---|---|---|
| 71.5 | 0.300 | 0.599 |
| 71.5 | 0.301 | 0.585 |
| 71.5 | 0.302 | 0.558 |
| 71.5 | 0.307 | 0.442 |
| 71.6 | 0.309 | 0.406 |
| 71.5 | 0.311 | 0.373 |
| 71.5 | 0.313 | 0.333 |
| 71.5 | 0.313 | 0.329 |

FIG. 10B

Yxy to AdobeRGB (22)

| R | G | B |
|---|---|---|
| 144 | 255 | 60 |
| 147 | 254 | 72 |
| 153 | 252 | 91 |
| 181 | 240 | 155 |
| 192 | 235 | 174 |
| 203 | 229 | 193 |
| 217 | 220 | 216 |
| 219 | 219 | 219 |

FIG. 10C

RGB to AdobeRGB expansion example (23)

| R | G | B |
|---|---|---|
| 21 | 255 | 14 |
| 53 | 254 | 47 |
| 81 | 252 | 76 |
| 153 | 240 | 150 |
| 175 | 235 | 172 |
| 195 | 229 | 192 |
| 216 | 220 | 216 |
| 219 | 219 | 219 |

Yxy (31)

| Y | x | y |
|---|---|---|
| 62.9 | 0.212 | 0.707 |
| 63.3 | 0.221 | 0.677 |
| 71.9 | 0.235 | 0.627 |
| 66.9 | 0.280 | 0.459 |
| 68.6 | 0.293 | 0.413 |
| 70.0 | 0.303 | 0.375 |
| 71.2 | 0.312 | 0.334 |
| 71.5 | 0.313 | 0.329 |

FIG. 17A

| AdobeRGB | x | y |
|---|---|---|
| R | 0.640 | 0.330 |
| G | 0.210 | 0.710 |
| B | 0.150 | 0.060 |

FIG. 17B

| sRGB | x | y |
|---|---|---|
| R | 0.640 | 0.330 |
| G | 0.300 | 0.600 |
| B | 0.150 | 0.060 |

FIG. 17C

| Output device 1 | x | y |
|---|---|---|
| R | 0.650 | 0.330 |
| G | 0.280 | 0.620 |
| B | 0.150 | 0.060 |

FIG. 17D

| Output device 2 | x | y |
|---|---|---|
| R | 0.65 | 0.33 |
| G | 0.22 | 0.69 |
| B | 0.15 | 0.06 |

| sRGB to output device 1 RGB | | |
|---|---|---|
| R | G | B |
| 88 | 254 | 27 |
| 92 | 253 | 40 |
| 96 | 252 | 51 |
| 99 | 251 | 60 |
| 134 | 236 | 135 |
| 179 | 220 | 179 |
| 199 | 210 | 200 |
| 207 | 206 | 207 |

| AdobeRGB to output device 2 RGB |||
|---|---|---|
| R | G | B |
| 0 | 254 | 0 |
| 25 | 253 | 35 |
| 69 | 251 | 70 |
| 150 | 239 | 149 |
| 173 | 235 | 171 |
| 194 | 229 | 170 |
| 216 | 220 | 216 |
| 219 | 219 | 219 |

FIG. 28A

Yxy to output device (22)

| R | G | B |
|---|---|---|
| 134 | 255 | 0 |
| 138 | 254 | 0 |
| 145 | 252 | 0 |
| 154 | 249 | 65 |
| 177 | 240 | 138 |
| 189 | 235 | 163 |
| 201 | 229 | 187 |
| 217 | 220 | 218 |
| 219 | 219 | 219 |

FIG. 28B sRGB to output device conversion example (23)

| R | G | B | Y | Yxy x | y |
|---|---|---|---|---|---|
| 20 | 255 | 9 | 65.3 | 0.221 | 0.599 |
| 53 | 254 | 41 | 65.7 | 0.229 | 0.584 |
| 80 | 252 | 67 | 66.1 | 0.240 | 0.558 |
| 106 | 249 | 96 | 66.8 | 0.254 | 0.520 |
| 154 | 240 | 148 | 68.4 | 0.281 | 0.437 |
| 174 | 235 | 169 | 69.3 | 0.292 | 0.403 |
| 193 | 229 | 190 | 70.2 | 0.301 | 0.370 |
| 216 | 220 | 216 | 71.3 | 0.311 | 0.333 |
| 219 | 219 | 219 | 71.5 | 0.313 | 0.329 |

(31)

FIG. 30A sRGB data (20)

| R | G | B | xy x | xy y |
|---|---|---|---|---|
| 255 | 226 | 196 | 0.353 | 0.359 |
| 245 | 200 | 180 | 0.362 | 0.350 |
| 224 | 189 | 164 | 0.362 | 0.358 |
| 183 | 143 | 123 | 0.378 | 0.358 |
| 140 | 92 | 79 | 0.415 | 0.354 |
| 255 | 255 | 15 | 0.419 | 0.505 |
| 255 | 255 | 40 | 0.416 | 0.500 |
| 255 | 255 | 150 | 0.374 | 0.430 |
| 230 | 255 | 15 | 0.402 | 0.518 |
| 230 | 255 | 50 | 0.398 | 0.510 |
| 230 | 255 | 150 | 0.362 | 0.446 |

FIG. 30B xy to output device (22)

| R | G | B |
|---|---|---|
| 248 | 226 | 193 |
| 235 | 200 | 178 |
| 216 | 189 | 161 |
| 174 | 143 | 121 |
| 130 | 92 | 78 |
| 255 | 255 | 0 |
| 255 | 255 | 0 |
| 255 | 255 | 135 |
| 236 | 255 | 0 |
| 236 | 255 | 0 |
| 236 | 255 | 122 |

FIG. 30C (c)sRGB to output device RGB color conversion example (23)

| R | G | B | xy x | xy y |
|---|---|---|---|---|
| 249 | 228 | 197 | 0.350 | 0.357 |
| 236 | 204 | 183 | 0.359 | 0.349 |
| 219 | 194 | 167 | 0.358 | 0.357 |
| 180 | 150 | 129 | 0.372 | 0.356 |
| 138 | 100 | 85 | 0.408 | 0.354 |
| 255 | 255 | 15 | 0.404 | 0.481 |
| 255 | 255 | 40 | 0.402 | 0.477 |
| 255 | 255 | 142 | 0.370 | 0.424 |
| 230 | 255 | 15 | 0.381 | 0.496 |
| 230 | 255 | 48 | 0.378 | 0.489 |
| 238 | 255 | 142 | 0.355 | 0.430 |

COLOR CONVERSION DEVICE, COLOR CONVERSION TABLE AND COLOR CONVERSION METHOD

BACKGROUND OF INVENTION

1. Technical Field

The present invention relates to a color conversion device, a color conversion table, and a color conversion method, and particularly to a color conversion device which converts input color data in a first color gamut into color data in a second color gamut and then outputs the color data.

2. Background Art

In order to achieve color reproduction between different devices and different media, it is necessary to correct a difference in color gamut between input and output devices. A technique of correcting the difference in color gamut between the input and output devices is referred to as either color gamut conversion or color gamut compression and expansion.

For example, as display output devices which perform image display, there are CRTs (Cathode Ray Tubes), PDPs (Plasma Display Panels), LCDs (Liquid Crystal Displays), and panels such as projector screens. Each of these has a different color gamut as a reproducible color gamut.

Since each device has a different reproducible color gamut, it is necessary, when, for instance, causing a display output device to display an image signal, to correct the image signal to a color gamut corresponding to the display output device.

In order to correct the difference in color gamut, it is common to convert the signal values from individual device or medium, represented by R, G, and B, into values of device-independent color system such XYZ, L*a*b*, and L*u*v* color spaces, for instance, CIE (Commission Internationale de l'Eclairage: International Commission on Illumination), and to perform compression and expansion on the values of the device-independent color system.

Meanwhile, color gamut compression methods can be mainly classified into compression and clipping.

Compression is a method for compressing all colors. In other words, in compression, when a first color gamut is compressed into a second color gamut, color conversion is performed by compressing all colors within the first color gamut so that all the colors are included in the second color gamut (e.g., refer to Patent References 1 to 3).

It is to be noted that the compression includes (i) a method in which colors within and out of a color gamut are linearly compressed and (ii) a non-linear compression method in which the compression rate is increased as the saturation of a color increases. In addition, there are disclosed methods for changing a compression ratio according to hue, saturation, or value, dividing a color gamut into regions in which colors are maintained and regions in which no color is maintained, and compressing saturation in each of the divided regions with each different Linear transformation (e.g., refer to Patent References 4 to 7).

On the other hand, clipping is a method for (i) faithfully reproducing (not compressing), among colors in the first color gamut, colors included in the second color gamut, that is, colors that can be faithfully reproduced by a reproducing device and (ii) compressing only non-reproducible colors, that is, colors that are not included in a color gamut of the reproducing device (e.g., refer to Patent Reference 8).

It is to be noted that, for clipping, there are disclosed a method for (i) compressing a color that cannot be reproduced in the color gamut of the reproducing device such that a color difference between the color before compression and the color after compression is minimum and (ii) reproducing the color before compression, and a method for performing compression such that colors of a neighborhood in value or saturation are selected (e.g., Patent References 9 and 10).

Furthermore, for color gamut expansion, there are disclosed a method in which, for instance, when an output color reproduction range with respect to an input image is broader than an input color reproduction range in terms of color system values, extension mapping is performed on the color system values of the input image so that the input color reproduction range is expanded according to a ratio between the input and output color reproduction ranges, after which the color system values are outputted (e.g., refer to Patent Reference 11), and a method of (i) transforming color coordinates by expanding color attributes of value (L*) and chroma (C*) using a linear extension equation and (ii) performing control so that the transformed color coordinates remain within a color gamut of a device (e.g., refer to Patent Reference 12).

Patent Reference 1: Japanese Unexamined Patent Application Publication No. 60-105376.
Patent Reference 2: Japanese Unexamined Patent Application Publication No. 61-288690.
Patent Reference 3: Japanese Unexamined Patent Application Publication No. 63-254889.
Patent Reference 4: Japanese Unexamined Patent Application Publication No. 06-225130.
Patent Reference 5: Japanese Unexamined Patent Application Publication No. 61-288662.
Patent Reference 6: Japanese Unexamined Patent Application Publication No. 07-220067.
Patent Reference 7: Japanese Unexamined Patent Application Publication No. 2003-283846.
Patent Reference 8: Japanese Unexamined Patent Application Publication No. 63-195777.
Patent Reference 9: Japanese Unexamined Patent Application Publication No. 04-040072.
Patent Reference 10: Japanese Unexamined Patent Application Publication No. 2000-278546.
Patent Reference 11: Japanese Unexamined Patent Application Publication No. 03-158075.
Patent Reference 12: Japanese Unexamined Patent Application Publication No. 2003-153027.

SUMMARY OF INVENTION

As stated above, the color gamut conversion, particularly the color gamut compression method, can be mainly classified into compression and clipping. However, compression and clipping have the following advantages and disadvantages.

In the compression, a relative color relationship for each color does not change and gradation expression is maintained. On the other hand, the compression has the disadvantage that even the colors that can be faithfully reproduced by the reproducing device having the second color gamut, that is, the colors that do not need compressing, are compressed, and thus the colors appear quite different from coloration of the first color gamut. In addition, the compression has the disadvantage that a pseudo contour and a pseudo gradation appear in a portion where colors smoothly change under non-linear compression.

In contrast, in the clipping, the reproducible colors are faithfully reproduced. However, in the clipping, since many out-of-color-gamut colors after compression become the same colors, there is the disadvantage that color tone continuity deteriorates and gradation expression is poor.

It is to be noted that the color gamut expansion has the same advantages and disadvantages as the compression. For example, when red and green color gamuts are largely expanded, coloration such as that of skin color and grass is changed, which gives people a feeling of strangeness.

Each of the conventional color gamut conversion methods involves how to shift or change a chromaticity point of first color data to a chromaticity point of second color data in a color space, for instance, a space such as XYZ or L*a*b*. Consequently, there is a possibility that the shift or change necessarily causes a bias and discontinuity in a color data distribution in the color space.

As described above, there is a problem that the conventional color gamut conversion methods have difficulty coping with both suppression of change in coloration and suppression of occurrence of color bias and color discontinuity.

The present invention has been devised to solve the above problem, and has an object to provide a color conversion device which makes it possible to suppress both the change in coloration and the occurrence of the color bias and color discontinuity, a color conversion table, and a color conversion method.

In order to achieve the above object, a color conversion device according to the present invention is a color conversion device which generates color data in a second color gamut based on first color data and second color data, which are obtained from input color data in a first color gamut, and outputs the generated color data, the color conversion device including: a first color mapping unit which generates the first color data by mapping the input color data into the second color gamut; a color mixing unit which generates color data by mixing the first color data and the second color data at a ratio corresponding to the first color gamut and the second color gamut; and a color data output unit which outputs the color data generated by the color mixing unit.

With this configuration, when performing color gamut compression or color gamut expansion on input color data and outputting the input color data to a device having a different color gamut, the color conversion device according to the present invention mixes, at a predetermined mixing ratio, two different color data based on the input color data. As a result, even when change in coloration is caused by shifting or changing a chromaticity point in one of the two color data, the color conversion device according to the present invention makes it possible to mitigate the change in coloration with the other color data. In addition, even when color bias and color discontinuity occur in the one of the two color data, the color conversion device according to the present invention makes it possible to mitigate the color bias and the color discontinuity with the other color data. Consequently, the color conversion device according to the present invention makes it possible to suppress both the change in coloration and the occurrence of the color bias and the color discontinuity.

Furthermore, when the first color gamut completely covers the second color gamut, the first color mapping unit may generate the first color data by compression-mapping the input color data in the first color gamut into the second color gamut, the color mixing unit may mixes the first color data and the second color data, and the second color data is the input color data in the first color gamut.

With this configuration, it is possible to simplify the configuration of the color conversion device because the input color data is used as the second color data.

Moreover, in the compression-mapping, the first color mapping unit may generate the first color data by mapping the input color data into the second color gamut so that chromaticity of the input color data is not displaced, when the input color data is within the second color gamut, and map the input color data to a color gamut boundary of the second color gamut when the input color data is out of the second color gamut.

With this configuration, the change in coloration is suppressed for the first color data, and the color bias and the color discontinuity are suppressed for the second color data. As a result, the color conversion device according to the present invention makes it possible to suppress the change in coloration and the occurrence of the color bias and the color discontinuity by setting a mixing ratio of the first color data high in a color region in which maintaining coloration is desired and by setting a mixing ratio of the second color data high in a color region in which suppression of the color bias and the color discontinuity is desired.

Furthermore, the color mixing unit may mix the first color data and the second color data so that a proportion of the second color data increases with an increase in a difference in area between the first color gamut and the second color gamut in terms of hue and value of the input color data.

With this configuration, when the difference in area between the color gamuts is great, the proportion of the second color data to be converted into color reproducible by an output device increases. Consequently, the color conversion device according to the present invention makes it possible to reproduce a color difference of the input color data in the vicinity of the boundary of the second color gamut.

Moreover, when the input color data is in a first color range, the color mixing unit may output the first color data as the mixed color data.

With this configuration, a mixing ratio of the first color data for which coloration is maintained increases, with respect to a color range which gives people a feeling of strangeness when the coloration such as human skin color and grass is changed. As a result, the color conversion device according to the present invention makes it possible to reduce the feeling of strangeness given to the people.

Furthermore, the first color range may correspond to human skin color.

Moreover, the color mixing unit may mix the first color data and the second color data so that the proportion of the second color data increases with an increase in saturation of the input color data.

Furthermore, wherein the first color mapping unit may (i) convert the input color data into data in a device-independent color space which is a color space independent of a device, (ii) inversely convert the converted data in the device-independent color space into data in a color space dependent on a device having the second color gamut, (iii) output the inversely-converted data as the first color data when the inversely-converted data is within the second color gamut, and (iv) convert the inversely-converted data into data at the color gamut boundary of the second color gamut and output the converted data as the first color data when the inversely-converted data is out of the second color gamut.

Moreover, the color conversion device further includes a second color mapping unit which generates the second color data by mapping the input color data into the second color gamut, wherein when the first color gamut completely covers the second color gamut, the first color mapping unit may generate the first color data by compression-mapping the input color data in the first color gamut into the second color gamut, and when the input color data is in a predetermined first color range of the first color gamut, the second color mapping unit may generate the second color data by mapping the input color data into color data in the second color gamut, the color data being associated with the first color range.

Furthermore, when the second color gamut completely covers the first color gamut, the first color mapping unit may generate the first color data by mapping the input color data into the second color gamut so that chromaticity of the input color data is not displaced, the color mixing unit may mix the first color data and the second color data, and the second color data is the input color data in the first color gamut.

With this configuration, the change in coloration is suppressed for the first color data, and the color bias and the color discontinuity are suppressed for the second color data. Consequently, the color conversion device according to the present invention makes it possible to suppress the change in coloration and the occurrence of the color bias and the color discontinuity by setting a mixing ratio of the first color data high in a color region in which maintaining coloration is desired and by setting a mixing ratio of the second color data high in a color region in which suppression of the color bias and the color discontinuity is desired.

Moreover, the color mixing unit may mix the first color data and the second color data so that a proportion of the second color data increases with an increase in a difference in area between the first color gamut and the second color gamut in terms of hue and value of the input color data.

With this configuration, when the difference in area between the color gamuts is great, the proportion of the second color data to be converted into the color reproducible by the output device increases. As a result, the color conversion device according to the present invention makes it possible to generate color data obtained by shifting input color to a color range reproducible by the output device.

Furthermore, when the input color data is in a first color range, the color mixing unit may output the first color data as the mixed color data.

With this configuration, the mixing ratio of the first color data for which the coloration is maintained increases, with respect to the color range which gives people a feeling of strangeness when the coloration such as the human skin color and grass is changed. Consequently, the color conversion device according to the present invention makes it possible to reduce the feeling of strangeness given to the people.

Moreover, the first color mapping unit may generate the first color data by (i) converting the input color data into data in a device-independent color space which is a color space independent of a device and (ii) inversely converting the converted data in the device-independent color space into data in a color space dependent on a device having the second color gamut.

Furthermore, the color conversion device further includes a second color mapping unit which generates the second color data by mapping the input color data into the second color gamut, wherein when the second color gamut completely covers the first color gamut, the first color mapping unit may generate the first color data by mapping the input color data into the second color gamut so that chromaticity of the input color data is not displaced, and the second color mapping unit may generate the second color data by mapping the input color data in the first color gamut into predetermined color data in the second color gamut.

Moreover, the color conversion device further includes: a second color mapping unit which generates the second color data by mapping the input color data into the second color gamut; and a color gamut area decision unit which decides whether or not the input color data is within the second color gamut, wherein when the color gamut area decision unit decides that the input color data is within the second color gamut, the first color mapping unit may generate the first color data by mapping the input color data into the second color gamut so that chromaticity of the input color data is not displaced, and the color mixing unit may mix the first color data and the second color data, and the second color data is the input color data in the first color gamut.

With this configuration, even when one of the first color gamut and the second color gamut does not cover the other of the first and second color gamuts, the color conversion device according to the present invention makes it possible to perform color gamut conversion in which both the change in coloration and the color bias and the color discontinuity are suppressed.

Furthermore, the color conversion device further includes a conversion table which indicates a correspondence relationship between an RGB signal of the input color data and the ratio, wherein the color mixing unit may output, as the color data, the mixed color data, using the ratio which is obtained from the conversion table and is based on the input color data.

It is to be noted that the present invention can be realized not only as such a color conversion device but also as a color conversion method having, as steps, characteristic units included in the color conversion device, and a color conversion program which causes a computer to execute such characteristic steps.

Moreover, the present invention can be also realized as a color conversion table which is referred to for achieving input and output characteristics equivalent to those of the color conversion device, a color conversion table creation device which creates a color conversion table, a color conversion table creation method which has, as steps, characteristic units included in the color conversion table creation device, and a color conversion table creation program which causes a computer to execute such characteristic steps.

It goes without saying that such a color conversion program, a color conversion table, and a color conversion table creation program can be distributed via a recording medium such as a CD-ROM and a transmission medium such as the Internet. Furthermore, the present invention can be also realized as a color conversion device which performs color conversion processing based on a color conversion table recording medium on which a color conversion table is recorded.

Moreover, the present invention can be realized as a semiconductor integrated circuit which realizes part or all of the functions of the color conversion device or the color conversion table creation device.

As described above, the present invention can provide a color conversion device which makes it possible to suppress the change in coloration and the occurrence of the color bias and the color discontinuity, a color conversion table, and a color conversion method.

BRIEF DESCRIPTION OF DRAWINGS

FIG. 7A is a diagram showing an example of color gamut compression by the color conversion device according to Embodiment 1 of the present invention.

FIG. 7B is a diagram showing an example of color gamut compression by the color conversion device according to Embodiment 1 of the present invention.

FIG. 7C is a diagram showing an example of color gamut compression by the color conversion device according to Embodiment 1 of the present invention.

FIG. 10A is a diagram showing an example of color gamut expansion by the color conversion device according to Embodiment 1 of the present invention.

FIG. 10B is a diagram showing an example of color gamut expansion by the color conversion device according to Embodiment 1 of the present invention.

FIG. 10C is a diagram showing an example of color gamut expansion by the color conversion device according to Embodiment 1 of the present invention.

FIG. 17A is a diagram showing xy values of chromaticity coordinates of the RGB three primary colors of AdobeRGB according to Embodiment 2 of the present invention.

FIG. 17B is a diagram showing xy values of chromaticity coordinates of the RGB three primary colors of sRGB according to Embodiment 2 of the present invention.

FIG. 17C is a diagram showing xy values of chromaticity coordinates of the RGB three primary colors of an output device 1 according to Embodiment 2 of the present invention.

FIG. 17D is a diagram showing xy values of chromaticity coordinates of the RGB three primary colors of an output device 2 according to Embodiment 2 of the present invention.

FIG. 19 is a diagram showing an example of color gamut compression by the color conversion device according to Embodiment 2 of the present invention.

FIG. 21 is a diagram showing an example of color gamut expansion by the color conversion device according to Embodiment 2 of the present invention.

FIG. 28A is a diagram showing an example of color gamut conversion by the color conversion device according to Embodiment 3 of the present invention.

FIG. 28B is a diagram showing an example of color gamut conversion by the color conversion device according to Embodiment 3 of the present invention.

FIG. 30A is a diagram showing an example of color gamut conversion by the color conversion device according to Embodiment 3 of the present invention.

FIG. 30B is a diagram showing an example of color gamut conversion by the color conversion device according to Embodiment 3 of the present invention.

FIG. 30C is a diagram showing an example of color gamut conversion by the color conversion device according to Embodiment 3 of the present invention.

NUMERICAL REFERENCES

Figure 1:
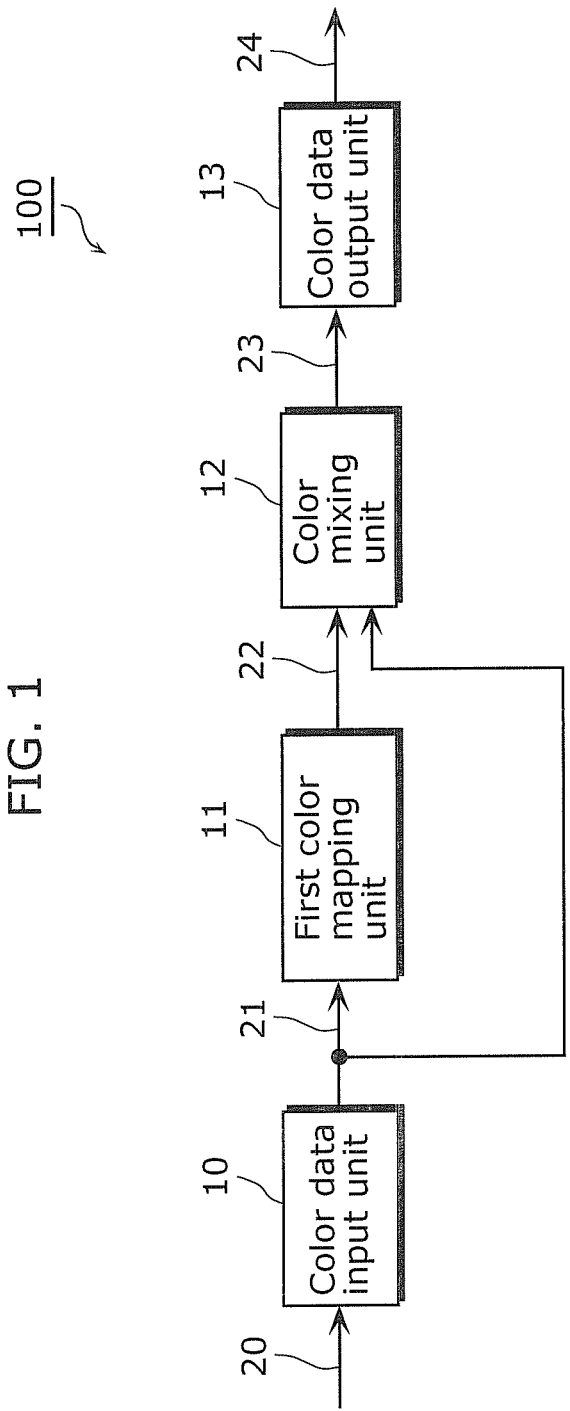
FIG. 1 is a block diagram showing a basic configuration of a color conversion device according to Embodiment 1 of the present invention.

10 Color data input unit
11 First color mapping unit
12 Color mixing unit
13 Color data output unit
14 Second color mapping unit
15 Color gamut area decision unit
20, 21 Input color data
22 First converted color data
23 Color data
24 Color data
25 Second converted color data
26 Intra-color-gamut identification signal
27 Extra-color-gamut identification signal
28 Color data
30, 31 Yxy chromaticity value
32, 33 xy chromaticity value
40, 41, 42 Color gamut area
100, 101, 200, 300, 400, 500 Color conversion device
401, 402, 403, 502 3D LUT
404, 405, 406, 503 3D interpolation unit
410, 416, 510, 513, 518 R signal
411, 417, 511, 514, 519 G signal
412, 418, 512, 515, 520 B signal
413, 414, 415 Data
501 Matrix operation unit
504, 505, 506 Mixing unit
516, 517 Mixing ratio data

DETAILED DESCRIPTION OF INVENTION

Hereinafter, embodiments of the present invention are described with reference to the drawings.

(Embodiment 1)

A color conversion device according to Embodiment 1 of the present invention converts input color data into a first converted color data for which coloration is maintained, mixes the converted color data and the original input color data in which no color bias and color discontinuity have occurred, and outputs the mixed data. With this, the color conversion device according to the present invention makes it possible to suppress both change in coloration and occurrence of the color bias and the color discontinuity, by changing a mixing ratio depending on which of the color bias and the color discontinuity is prioritized.

First, the following describes a configuration of the color conversion device according to Embodiment 1 of the present invention.

FIG. 1 is a block diagram showing a basic configuration of a color conversion device 100 according to Embodiment 1 of the present invention. The color conversion device 100 shown in FIG. 1 converts input color data 20 in a first color gamut into color data 24 in a second color gamut, and outputs the color data 24 to an output device. In addition, the color conversion device 100 generates the color data 24 in the second color gamut based on first color data and second color data that are obtained from the input color data in the first color gamut, and then outputs the color data 24. The color conversion device 100 includes: a color data input unit 10 which inputs, as input color data 20 such as RGB, video or image data such as a picture, and outputs input color data 21; a first color mapping unit 11 which generates a first converted color data 22 by mapping the input color data 21 into a predetermined color gamut; a color mixing unit 12 which generates color data 23 by mixing, at a predetermined ratio, the mapped first converted color data 22 and the input color data 21 directly provided from the color data input unit 10; and a color data output unit 13 which outputs, as color data 24, the color data 23 to a device such as a display or printer which causes colors to appear.

However, the manner in which the above first color mapping unit 11 performs the mapping differs depending on whether the color conversion is related to color gamut compression or color gamut expansion.

In the color gamut compression, that is, when a color gamut of the input color data 20 is broader than a color gamut of the output device (the first color gamut completely covers the second color gamut), the first color mapping unit 11 compression-maps the input color data 20 as color data within the color gamut of the output device.

On the other hand, in the color gamut expansion, that is, when the color gamut of the input color data 20 is narrower than the color gamut of the output device (the second color gamut completely covers the first color gamut), the first color mapping unit 11 maps the input color data 21 as the color data within the color gamut of the output device.

First, the following describes the color gamut compression, that is, a case where the color gamut of the input color data 20 is broader than a color gamut of the color data 24 to be outputted by the color data output unit 13. For instance, there is a case where a picture captured in Adobe® format is outputted to an sRGB (standard RGB) display or a case where image signals of NTSC (National Television Standards Committee) are displayed on a BT.709 display.

Figure 2:
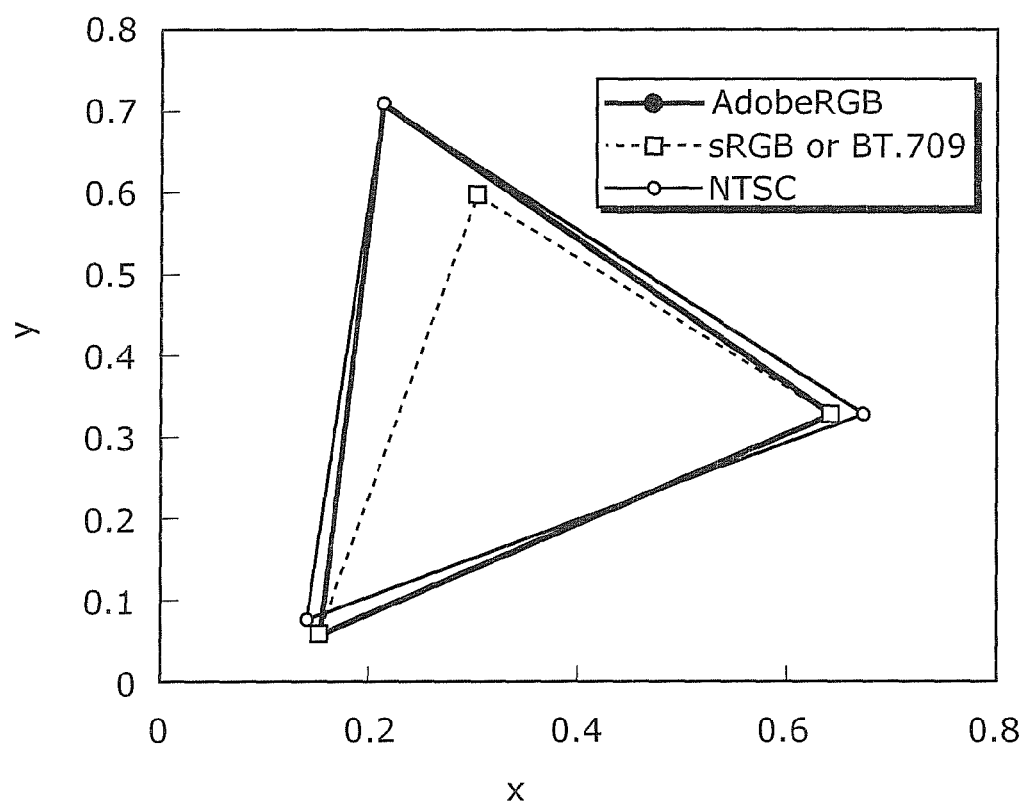
FIG. 2 is a diagram showing an example of different color gamut standards in the color conversion device according to Embodiment 1 of the present invention.

FIG. 2 is a diagram showing color gamuts of Adobe, NTSC, sRGB, and BT.709. As shown in FIG. 2, the color gamuts of the Adobe and the NTSC are broader than those of the sRGB and the BT.709, and thus the color gamuts need compressing.

The color data input unit 10 converts image data (input color data 20) inputted from the outside into linear RGB input color data 21. For example, since gamma (γ) of AdobeRGB and sRGB is 0.45, the color data input unit 10 performs normalization (to a value of 0.0 to 1.0) by dividing the RGB input color data 20 by a level width (255 in 8 bits), and converts the normalized image data into a linear value by raising the normalized image data to the power of reverse gamma 2.2, so as to generate the input color data 21. It is to be noted that when the inputted image data is not RGB color data, for instance, when the inputted image data is image data including value data and color difference data, the color data input unit 10 may temporarily convert the inputted color data into the RGB data, and then convert the RGB data into the linear RGB input color data 21. In addition, the color data input unit 10 provides the converted input color data 21 to the first color mapping unit 11 and the color mixing unit 12.

The first color mapping unit 11 generates the first converted color data 22 by compression-mapping, into color data within the color gamut of the color data 24, the input color data 21 provided from the color data input unit 10. Here, the first color mapping unit 11 compression-maps the input color data 21 so that chromaticity is not displaced (coloration is not changed) as much as possible.

More specifically, in the compression-mapping, the first color mapping unit 11 temporarily converts the RGB input color data 21 provided from the color data input unit 10 into a device-independent color space which is a color space independent of a device, for example, a CIE XYZ chromaticity value, compresses the converted chromaticity value into a chromaticity value within the color gamut of the output device, and generates the first converted color data 22 by inversely converting the chromaticity value into the original RGB color data.

For instance, when the input color data 20 is RGB data in AdobeRGB format, the first color mapping unit 11 performs conversion from RGB to XYZ using Expression 1, and when the output device is an sRGB display, the first color mapping unit 11 performs conversion from XYZ to RGB using Expression 2.

Expression 1

$$\begin{bmatrix} X \\ Y \\ Z \end{bmatrix} = \begin{bmatrix} 0.5767 & 0.1855 & 0.1882 \\ 0.2973 & 0.6273 & 0.0753 \\ 0.0270 & 0.0707 & 0.9913 \end{bmatrix} \begin{bmatrix} R \\ G \\ B \end{bmatrix} \quad [\text{Math. 1}]$$

Expression 2

$$\begin{bmatrix} R \\ G \\ B \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix} \quad [\text{Math. 2}]$$

It is to be noted that the first color mapping unit 11 basically employs the above-described clipping as the compression-mapping in the present embodiment. The color gamut compression by the clipping allows colors reproducible within the color gamut of the output device to be faithfully reproduced. Here, it is necessary to prevent a chromaticity point of input color data from being displaced as much as possible for a color such as human skin color which gives people a feeling of strangeness when its coloration is changed. Consequently, clipping compression which allows a color range having not-too-high saturation such as the human skin color to be reproduced within the color gamut of the output device and directly reproduces the chromaticity point of the input color data (e.g., a point indicated by a chromaticity value such as XYZ) is suitable.

In the simplest clipping compression, when, for instance, an AdobeRGB color gamut is converted into an sRGB color gamut, the value of one of R, G, or B is set to be 0 when the value is 0 or lower in Expression 2, and the value is set to 1 when the value is 1 or higher. In other words, in the compression mapping, the first color mapping unit 11 maps the input color data 21 within the second color gamut so that chromaticity is not displaced (hereinafter, chromaticity displacement) when the chromaticity value of the input color data 21 is included in the second color gamut, and maps the input color data 21 into a color gamut boundary of the second color gamut when the chromaticity value of the input color data 21 is out of the second color gamut.

It is to be noted that for the clipping, a method in which an out-of-color-gamut color that cannot be reproduced in a color gamut is compressed such that a color difference is minimum may be employed, or a color of a neighborhood in value or saturation may be selected. In this case, the first color mapping unit 11 converts an XYZ value into a chromaticity value in an L*a*b* space using Expressions 3 and 4, and then calculates value (L), saturation (C), and hue (H). Next, the first color mapping unit 11 performs the clipping based on the color difference, value, or saturation, using the calculated values of the value (L), the saturation (C), and the hue (H). It is to be noted that Xn, Yn, and Zn in Expression 3 are tristimulus values of a light source, and, for example, in the case of a standard illuminant $D_{65}$, (Xn, Yn, Zn)=(95.04, 100.00, 108.89).

[Math. 3]

$$L=116(Y/Y_n)^{1/3}-16$$

$$a=500\{(X/X_n)^{1/3}-(Y/Y_n)^{1/3}\}$$

$$b=200\{(Y/Y_n)^{1/3}-(Z/Z_n)^{1/3}\}$$

Expression 3

[Math. 4]

$$C=\sqrt{a^2+b^2}$$

$$H=\arctan(b/a)$$

Expression 4

The color mixing unit 12 generates color data 23 by mixing, according to the first and second color gamuts, the input color data 21 (RGB) outputted from the color data input unit 10 and first converted color data 22 (R'G'B') which is compression-mapped by the above-described first color mapping unit 11. To put it differently, the color mixing unit 12 mixes the input color data 21 and the first converted color data 22, and the input color data 21 in the first color gamut is color data in the second color gamut.

Here, the color mixing unit 12 mixes the input color data 21 and the first converted color data 22 so that a proportion of the compression-clipped first converted color data (R'G'B') is as high as possible for a color such as the human skin color which gives people a feeling of strangeness when its coloration is changed, and so that, conversely, a proportion of the input color data 21 (RGB) is higher for a color at the output device color gamut boundary and the vicinity thereof.

Here, the input color data 21 in the first color gamut is color data treated as the color data in the second color gamut. That is, the input color data 21 corresponds to the color data obtained by reducing the chromaticity of the first color gamut to the second color gamut at a predetermined ratio. Consequently, the input color data 21 is the color data in which color bias and color discontinuity due to color gamut conversion have not occurred.

As a specific mixing method, for instance, the color mixing unit 12 first calculates the hue (H), the saturation (S), and the value (V) from the input color data 21 (RGB). For example, the color mixing unit 12 employs Expression 5 indicated below or Expressions 3 and 4.

Expression 5

$$H = \begin{cases} 60 \times \frac{G-B}{\text{MAX}-\text{MIN}} + 0, & \text{if MAX} = R \\ 60 \times \frac{B-R}{\text{MAX}-\text{MIN}} + 120, & \text{if MAX} = G \\ 60 \times \frac{R-B}{\text{MAX}-\text{MIN}} + 240, & \text{if MAX} = B \end{cases} \quad [\text{Math. 5}]$$

$$S = \frac{\text{MAX}-\text{MIN}}{\text{MAX}}$$

$$V = \text{MAX}$$

In Expression 5, MAX and MIN indicate the maximum value and the minimum value of a RGB value, respectively.

Next, using the hue (H), the saturation (S), and the value (V), the color mixing unit 12 sets a color range in which it is desired not to change coloration such as human skin color as much as possible (hereinafter, referred to as a preservation color range), and a color range where such is not the case, that is, the color range to be compressed (hereinafter, referred to as a compression color range). In addition, the color mixing unit 12 changes, with respect to each of the preservation color range and the compression color range, a mixing ratio between the input color data 21 (RGB) and the first converted color data 22 (R'G'B') based on the values of the hue (H), the saturation (S), and the value (V), and mixes the input color data 21 and the first converted color data 22.

When the mixing ratio is represented by r and a range of the ratio is indicated by 0.0 to 1.0, r=1.0 when a proportion of the input color data 21 (RGB) to the color data 23 is 100%, and r=0.0 when a proportion of the first converted color data 22 (R'G'B') to the color data 23 is 100%. Thus, when r is a value between 0.0 and 1.0, the input color data 21 (RGB) and the first converted color data 22 (R'G'B') are mixed at the mixing ratio r. In other words, the color mixing unit 12 generates the color data 23 by multiplying the input color data 21 (RGB) by r and the first converted color data 22 (R'G'B') by 1−r, and adding them up.

However, the above-described mixing ratio r differs depending on the hue (H), the saturation (S), and the value (V) of the input color data 21. For instance, when the AdobeRGB color gamut is converted into the sRGB color gamut, since a color region of green (G), yellow (Y), and cyan (C) in particular is narrowed for the hue (H), the mixing ratio of the input color data 21 (RGB) is set higher in this region.

Furthermore, for the saturation (S), the mixing ratio of the input color data 21 (RGB) is set higher as saturations for all hues increase. At this time, the setting of the mixing ratio is adjusted based on the hue and the value.

Moreover, for the value (V), the mixing ratio of the input color data 21 (RGB) is set higher when the value is relatively high. At this time, the setting of the mixing ratio is adjusted based on the saturation and the hue.

Furthermore, the mixing ratio r is basically set based on a difference in area (or ratio) between the first color gamut and the second color gamut. When the first color gamut is broader than the second color gamut and is converted into the second color gamut through color gamut compression, the mixing ratio of the input color data 21 (RGB) is set higher as the first color gamut is greater in area than the second color gamut. However, the mixing ratio is adjusted based on the hue (H), the saturation (S), and the value (V) because the difference (or ratio) in area between two color gamuts is not uniform but often different depending on the hue (H), the saturation (S), and the value (V).

Figure 3A:
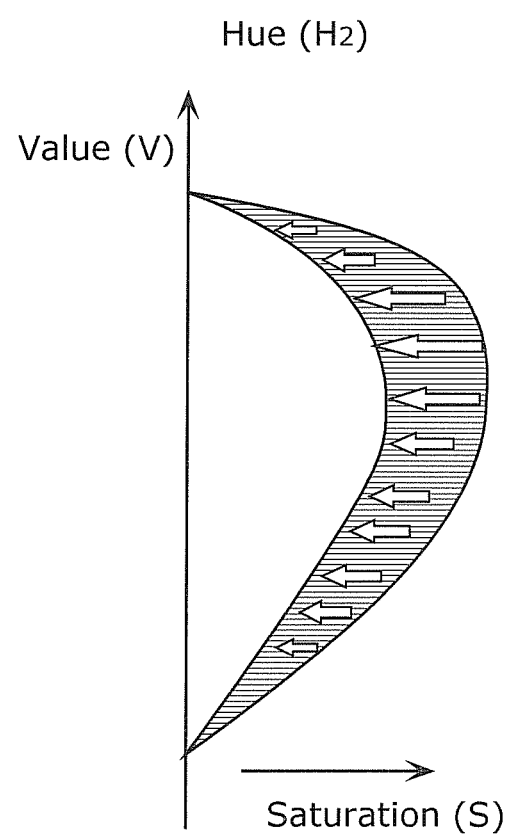
FIG. 3A is a diagram showing an example of color gamut compression by the color conversion device according to Embodiment 1 of the present invention.
Figure 3B:
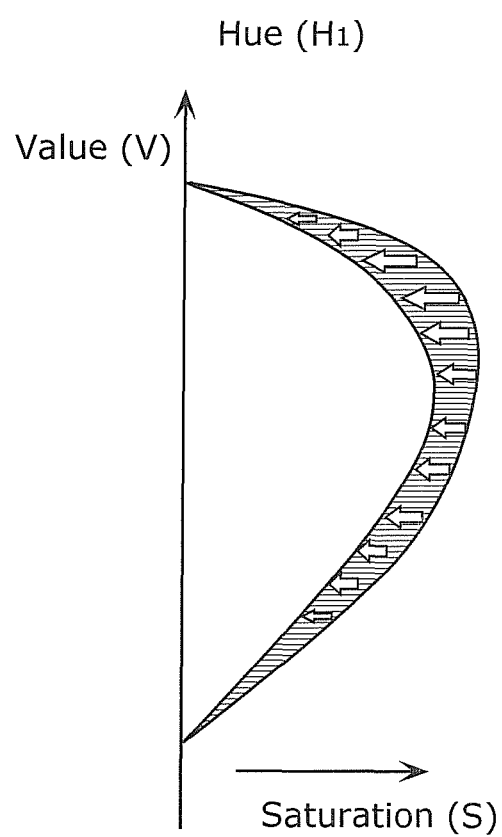
FIG. 3B is a diagram showing an example of color gamut compression by the color conversion device according to Embodiment 1 of the present invention.
Figure 3C:
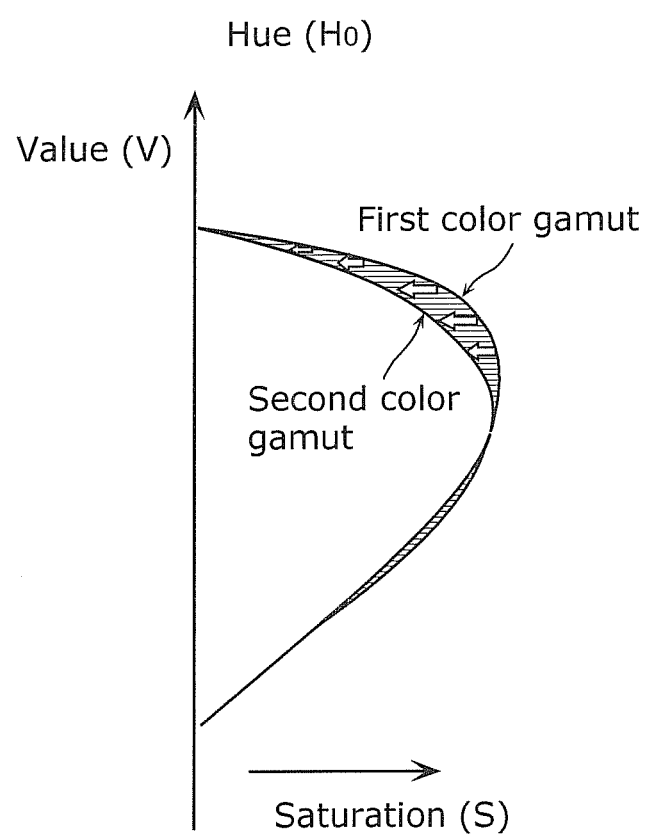
FIG. 3C is a diagram showing an example of color gamut compression by the color conversion device according to Embodiment 1 of the present invention.

Each of FIGS. 3A to 3C is a diagram visually showing, with respect to three different hues (H0, H1, H2), a difference in area between two color gamuts and a magnitude of a mixing ratio at the time. Moreover, each of FIGS. 3A to 3C shows a case where the first color gamut which is a broad color gamut is compressed to the second color gamut which is a narrower color gamut than that of the first color gamut. Furthermore, in FIGS. 3A to 3C, a shaded area indicates the difference in area between the two color gamuts. As exactly indicated by the size of the white arrow, the mixing ratio of the input color data 21 (RGB) is set higher as the shaded area is broader. For instance, the difference in area between the two color gamuts is relatively large in the hue H2 shown in FIG. 3A, the difference in area between the two color gamuts is relatively small in the hue H0 shown in FIG. 3C, and the difference in area between the two color gamuts is between those in the cases of the hues H0 and H2 in the hue H1 shown in FIG. 3B.

Figure 4:
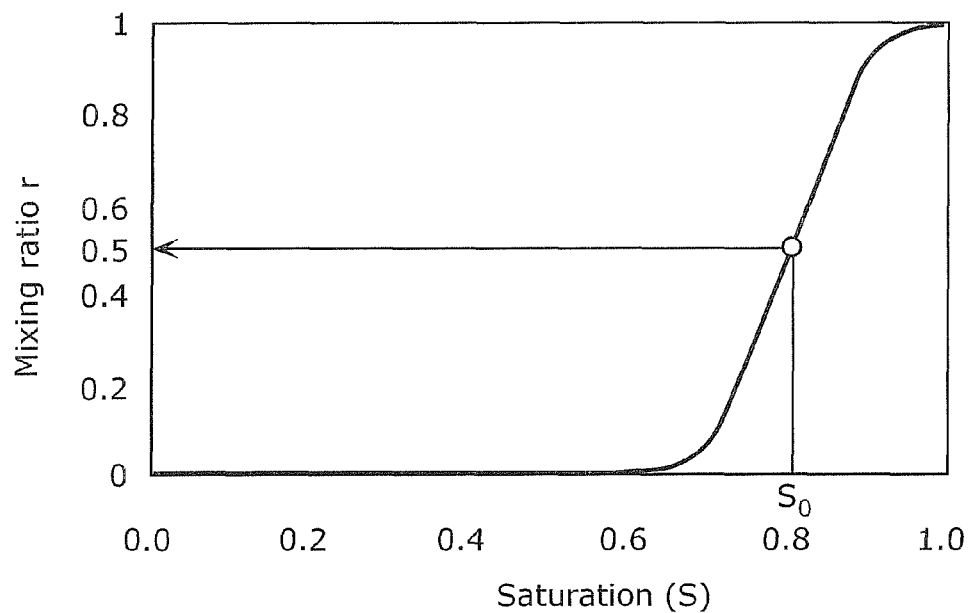
FIG. 4 is a diagram showing an example of a color mixing ratio of the color conversion device according to Embodiment 1 of the present invention.

More specifically, the following describes setting of a mixing ratio r corresponding to a magnitude of the saturation (S) at a certain value (e.g., the value (V) indicated by a vertical axis in FIGS. 3A to 3C) of a certain hue (e.g., H0 to H2 in FIGS. 3A to 3C). FIG. 4 shows a value of the mixing ratio r corresponding to the saturation (S) when the difference in area between the two color gamuts is small (e.g., a ratio of the first color gamut to the second color gamut is equal to or below 1.2). In this case, the mixing ratio r is set so that the threshold value of the saturation (S) at r=0.5 where proportions of mixing between the input color data 21 (RGB) and the first converted color data 22 (R'G'B') are equal to each other is $S_0$. In other words, the mixing ratio r is set so that the proportion of the input color data 21 (RGB) abruptly increases from the threshold value $S_0$ of the quite high saturation (S).

Figure 5:
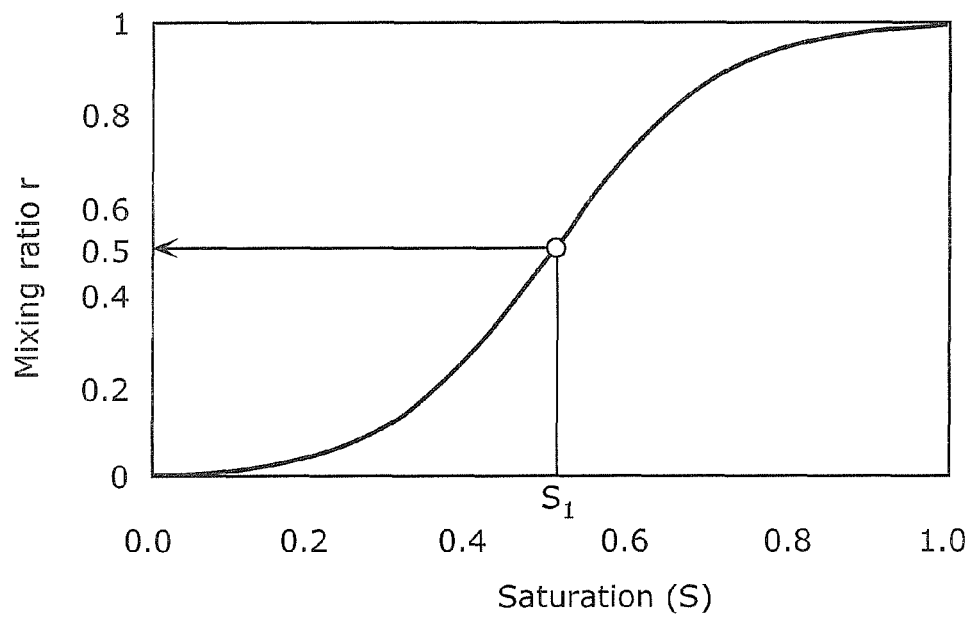
FIG. 5 is a diagram showing an example of a color mixing ratio of the color conversion device according to Embodiment 1 of the present invention.

Furthermore, FIG. 5 shows a value of the mixing ratio r corresponding to the saturation (S) when the difference in area between the two color gamuts is intermediate (e.g., the ratio of the first color gamut to the second color gamut is 1.2 to 1.5). In this case, the mixing ratio r is set so that a threshold value of the saturation (S) at r=0.5 is $S_1$. In other words, the mixing ratio r is set so that the proportion of the input color data 21 (RGB) gradually increases from the threshold value $S_1$ of the intermediate saturation (S).

Figure 6:
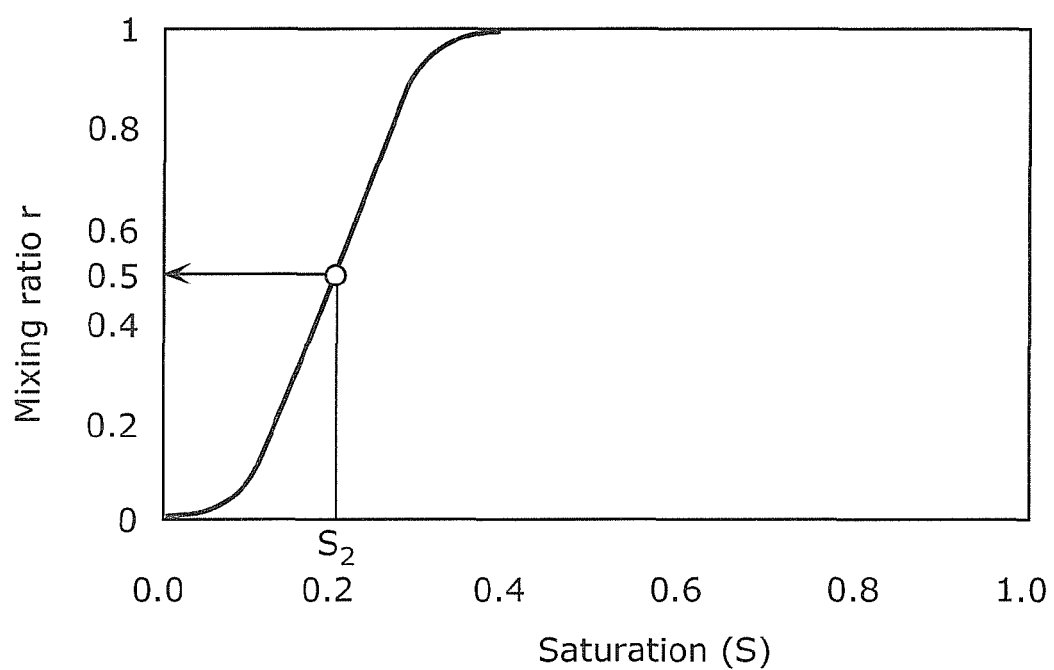
FIG. 6 is a diagram showing an example of a color mixing ratio of the color conversion device according to Embodiment 1 of the present invention.

Moreover, FIG. 6 shows a value of the mixing ratio r corresponding to the saturation (S) when the difference in area between the two color gamuts is large (e.g., the ratio of the first color gamut to the second color gamut is above 1.5). In this case, the mixing ratio r is set so that a threshold value of the saturation (S) at r=0.5 is $S_2$. In other words, the mixing ratio r is set so that the proportion of the input color data 21 (RGB) abruptly increases from the threshold value $S_2$ of the quite small saturation (S).

As stated above, the input color data 21 is used as the color data 23 in the broader color gamut as the difference in area between the two color gamuts is greater. In addition, when a comparison is made on the same saturation (S), the mixing ratio of the input color data 21 increases with an increase in the difference in area between the two color gamuts.

Furthermore, as stated above, the value of the mixing ratio r corresponding to the saturation (S) is set for each of pairs of the hue (H) and the value (V) (a vertical axis in FIGS. 3A to 3C) as shown in FIGS. 4 to 6.

It is to be noted that in the preservation color range in which it is desired not to change the coloration such as the human skin color as much as possible, the ratio for mixing the first converted color data 22 (R'G'B') is set higher. For instance, in the case of the human skin color, when color data is in a range where the hue (H) is red, yellow, and magenta and the value (V) is at an intermediate to high level, the mixing ratio of the first converted color data 22 (R'G'B') is increased, and conversely the mixing ratio of the input color data 21 (RGB) is decreased. In addition, the threshold value of the saturation (S) is set so that a threshold value of the saturation (S) at r=0.5 is in a range of 0.5 to 0.8.

To put it differently, when the input color data 21 is included in the compression color range, the mixing ratio r is determined by the above-described area between the two color gamuts, the hue (H), the saturation (S), and the value (V), and in the preservation color range, the ratio for mixing the first converted color data 22 is set higher than when the ratio is determined by the same method as the compression color range. For example, when the input color data is included in a first color range (such as the human skin color), the color mixing unit 12 outputs the first converted color data 22 as the color data 23.

It is to be noted that although a sigmoid nonlinear function is employed as a function of the above-described mixing ratio r in the present embodiment, the function may be a linear function.

Next, each of FIGS. 7A to 7C and 8 shows an example of (i) the color data 23 obtained by mixing the input color data 20 (RGB) and the first converted color data 22 (R'G'B') and (ii) a chromaticity point of the color data 23.

FIG. 7A is a diagram showing 8-bit input color data 20 (RGB) in AdobeRGB which is the first color gamut, and a Yxy chromaticity value 30 obtained by performing first an inverse gamma conversion on input color data 21 (RGB) and then an XYZ conversion on the converted input color data 21 using Expression 1. FIG. 7B is a diagram showing a value of first converted color data 22 (R'G'B') that is converted to 8-bit R'G'B' ranging from 0 to 255 by converting, using Equation 2, the Yxy chromaticity value 30 after the XYZ conversion into sRGB which is the second color gamut and further performing a gamma conversion on the converted value. However, the first converted color data 22 is a value that is clipped to 0 when a RGB value is equal to or below 0 in Expression 2 and that is clipped to 1 when the RGB value is equal to or above 1 in Expression 2. FIG. 7C is a diagram showing a value of the color data 23 and a Yxy chromaticity value 31 of the color data 23 which is obtained by mixing, at the mixing ratio r value compliant with the above-described setting, AdobeRGB data which is the input color data 21 and data which is compression-clipped to sRGB.

Figure 8:
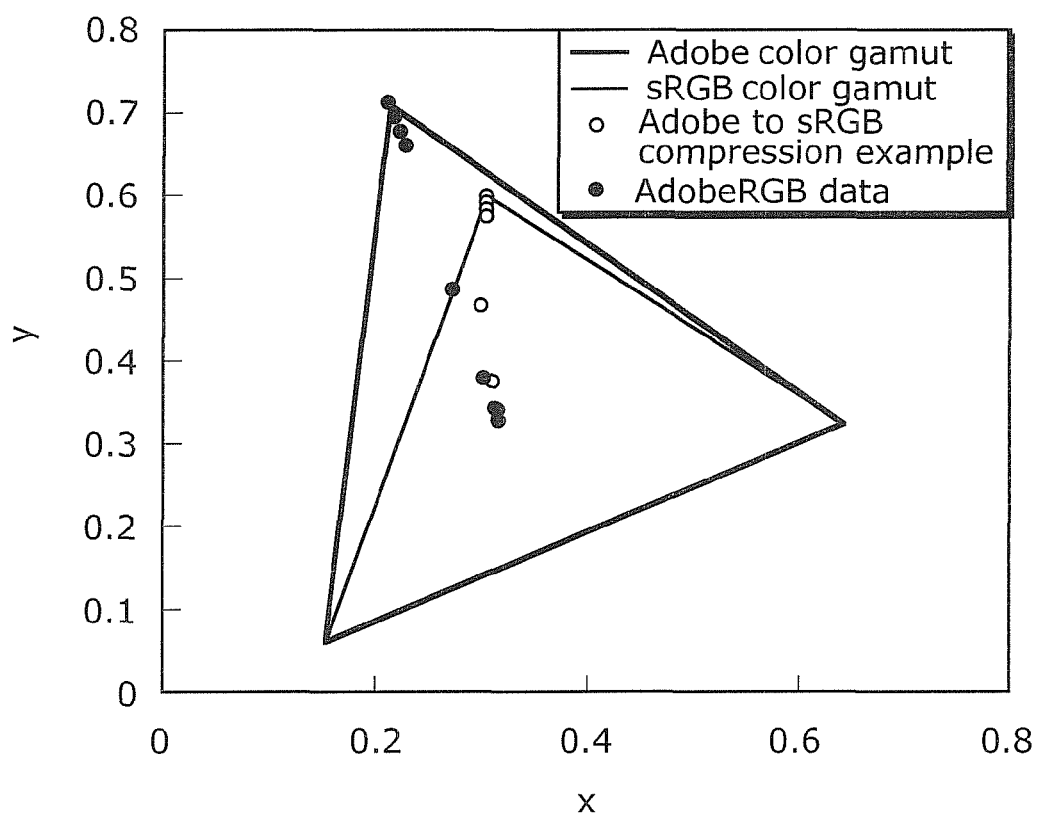
FIG. 8 is a diagram showing an example of color gamut compression by the color conversion device according to Embodiment 1 of the present invention.

The AdobeRGB data (input color data 20) which is shown in the above-described FIG. 7A indicates sample data when a green (G) level value is changed and Y indicating value is maintained constant as much as possible. FIG. 8 shows comparison of a result of the color gamut compression conversion using the xy chromaticity value. In FIG. 8, a black dot indicates an xy value (a Yxy chromaticity value 30 in FIG. 7A) of the AdobeRGB data in the first color gamut, and a white dot indicates an xy value (the Yxy chromaticity value 31 in FIG. 7C) of data obtained by compressing the AdobeRGB data in the first color gamut into sRGB data in the second color gamut. As stated above, the result of the color gamut compression from AdobeRGB into sRGB is that a chromaticity value in a vicinity of white close to the human skin color is hardly displaced, relative color relationships remain unchanged, and continuity of color gradation is maintained.

The color data output unit 13 outputs, as color data 24, the color data 23 generated by the color mixing unit 12. The color data output unit 13 outputs the color data 24 to an output device such as a display, projector, or printer. The output device is a display having the sRGB color gamut in the above-described embodiment.

It is to be noted that although the above-described embodiment has described the color gamut compression from the AdobeRGB color gamut into the sRGB color gamut, it goes without saying that conversion can also be performed when color gamut compression from not only a specific color gamut such as a standard but also another broader color gamut into a narrower color gamut is performed.

As described above, the color conversion device 100 according to Embodiment 1 of the present invention outputs the color data 23 that is obtained by mixing the first converted color data 22 and the input color data 21, the first converted color data 22 being obtained by compression-mapping the input color data 21 in a broad color gamut into the output device having a narrow color gamut, and the input color data 21 being outputted without being compression-mapped and dependent on a device color gamut.

Furthermore, the color conversion device 100 mainly uses the reproducible color data within the color gamut, that is, the first converted color data 22 obtained by the compression-mapping, for the color data in which the coloration such as the human skin color should not be changed. Moreover, the color conversion device 100 mainly mixes the input color data 21 which is reproduced dependent on the color gamut of the output device, to the out-of-color-gamut input color data that cannot be reproduced by the output device. Furthermore, the color conversion device 100 moderately mixes the input color data 21 and the first converted color data 22 based on the hue, the saturation, and the value, and outputs the mixed data. With these, the color conversion device 100 makes it possible to maintain the coloration such as the human skin color and the continuity of the color gradation without changing the relative color relationships in the color gamut of the output device.

The following describes the color gamut expansion, that is, the case where the color gamut of the input color data 20 is narrower than the color gamut of the color data 24 to be outputted by the color data output unit 13. For instance, there is a case where, contrary to the above-described color gamut compression, a picture captured in sRGB format is outputted to an AdobeRGB display or a case where image signals of BT.709 are displayed on an NTSC color gamut display. As shown in FIG. 2, the AdobeRGB or NTSC color gamut is broader than the sRGB or BT.709 color gamut, and thus the color gamut needs expanding.

Although the color gamut expansion does not differ from the above-described color gamut compression in the overall basic configuration, the first color mapping unit 11 and the color mixing unit 12 function differently in some degree. In addition, the input color data and the color data which are respectively handled by the color data input unit 10 and the color data output unit 13 are only reversed, and the basic mechanism remains the same. As a result, the following mainly describes portions of the color gamut expansion that are particularly different. It is to be noted that hereinafter, contrary to the example of the above-described color gamut compression, the present embodiment describes color gamut conversion from sRGB into AdobeRGB.

The color data input unit 10 converts image data inputted from the outside (input color data 20) into linear RGB input color data 21. Since gamma (γ) of sRGB is 0.45, the color data input unit 10 performs normalization (to a value of 0.0 to 1.0) by dividing the RGB input color data 20 by a level width (255 in 8 bits), and converts the normalized image data into a linear value by raising the normalized image data to reverse γ2.2, so as to generate the input color data 21.

The first color mapping unit 11 generates first converted color data 22 by expansion-mapping the input color data 21 provided from the color data input unit 10 into color data within a color gamut of color data 24. More specifically, in the mapping, the first color mapping unit 11 performs the mapping without displacing an sRGB color gamut within an AdobeRGB color gamut of an output device and with a chromaticity point being maintained (without causing chromaticity displacement), that is, without expansion and compression.

More specifically, since AdobeRGB has a broader color gamut than sRGB, the first color mapping unit 11 temporarily converts the sRGB input color data 21 provided from the color data input unit 10 into a device-independent color space, for example, data in an XYZ device-independent color space, and then generates the first converted color data 22 by inversely converting the converted XYZ value as RGB of the AdobeRGB color gamut of the output device.

For instance, the first color mapping unit 11 converts RGB of sRGB into XYZ using Expression 6, and converts XYZ into RGB of AdobeRGB using Expression 7.

Expression 6

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix}$$ [Math. 6]

Expression 7

$$\begin{bmatrix} R \\ G \\ B \end{bmatrix} = \begin{bmatrix} 2.0416 & -0.5650 & -0.3447 \\ -0.9692 & 1.8760 & 0.0416 \\ 0.0134 & -0.1184 & 1.0152 \end{bmatrix} \begin{bmatrix} X \\ Y \\ Z \end{bmatrix}$$ [Math. 7]

With Expressions 6 and 7, the first converted color data 22 (RGB), which is a matrix converted from sRGB into AdobeRGB, maintains a chromaticity point of the sRGB color gamut within the AdobeRGB color gamut (that is, chromaticity preservation mapping which maintains the chromaticity point of the input color data 21).

The color mixing unit 12 generates color data 23 by mixing the input color data 21 (RGB) outputted from the color data input unit 10 and the first converted color data 22 (R'G'B') mapped by the above-described first color mapping unit 11.

Here, the color mixing unit 12 mixes the input color data 21 and the first converted color data 22 so that the proportion of the first converted color data 22 (R'G'B') mapped (the above-described chromaticity preservation mapping) by the first color mapping unit 11 is set as high as possible for the color such as the human skin color which gives people a feeling of strangeness when its coloration is changed, and conversely so that a proportion of the input color data 21 (RGB) is set higher for the color at the output device color gamut boundary and the vicinity thereof.

In the same manner as the above-described color gamut compression, a specific mixing method begins with calculating the hue (H), the saturation (S), and the value (V) from the input color data 21 (RGB). Then, a color range in which it is desired not to change the coloration such as the human skin color as much as possible (hereinafter, referred to as a preservation color range) and a color range where such is not the case, that is, the color range to be expanded (hereinafter, referred to as a expansion color range), are separated using the hue (H), the saturation (S), and the value (V). At the same time, a mixing ratio between the input color data 21 (RGB) and the first converted color data 22 (R'G'B') that is mapped (the above-described coloration preservation mapping) is changed based on values of the hue (H), the saturation (S), and the value (V), and the input color data 21 and the first converted color data 22 are mixed.

When the mixing ratio is represented by r and a range of the ratio is indicated by 0.0 to 1.0, r=1.0 is when a proportion of the input color data 21 (RGB) to color data 23 is 100%, and r=0.0 is when a proportion of the first converted color data 22 (R'G'B') to the color data 23 is 100%. Thus, when r is a value intermediate between 0.0 and 1.0, the input color data 21 (RGB) and the first converted color data 22 (R'G'B') are mixed at the mixing ratio r. In other words, the color mixing unit 12 generates the color data 23 by multiplying the input color data 21 (RGB) by r and the first converted color data 22 (R'G'B') by 1−r, and adding them up.

However, the above-described mixing ratio r differs depending on the hue (H), the saturation (S), and the value (V). For instance, when an AdobeRGB color gamut is converted into an sRGB color gamut, since especially a green (G), yellow (Y), and cyan (C) color area is narrowed for the hue (H), the mixing ratio of the input color data 21 (RGB) is set higher in the color area.

Furthermore, for the saturation (S), the mixing ratio of the input color data 21 (RGB) is set higher as saturations for all hues increase. At this time, the setting of the mixing ratio is adjusted based on the hue and the value.

Moreover, for the value (V), the mixing ratio of the input color data 21 (RGB) is set higher when the value is relatively high. At this time, the setting of the mixing ratio is adjusted based on the saturation and the hue.

Furthermore, the mixing ratio r is basically set based on a difference in area (or ratio) between the first color gamut and the second color gamut. When the first color gamut is narrower than the second color gamut and is converted into the second color gamut through color gamut expansion, the mixing ratio of the input color data 21 (RGB) is set higher as the second color gamut is greater in area than the first color gamut. However, the mixing ratio is adjusted based on the hue (H), the saturation (S), and the value (V), because a difference in area (or ratio) between two color gamuts is not uniform but often different depending on the hue (H), the saturation (S), and the value (V).

Figure 9A:
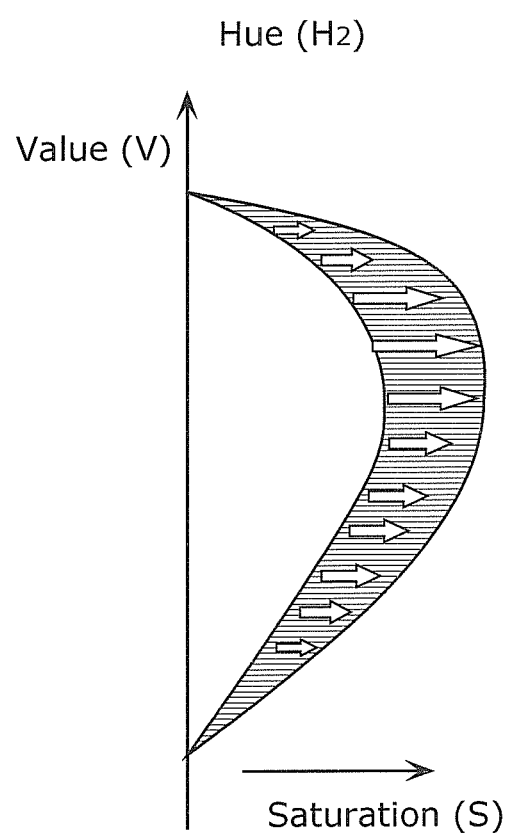
FIG. 9A is a diagram showing an example of color gamut expansion by the color conversion device according to Embodiment 1 of the present invention.
Figure 9B:
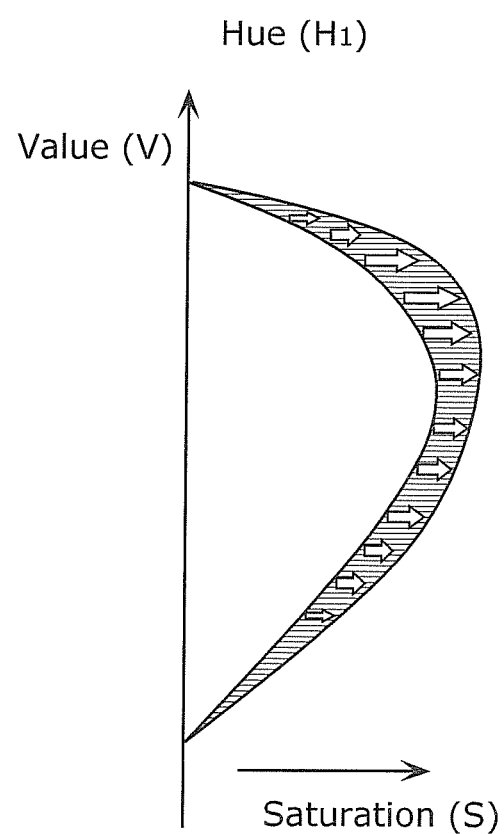
FIG. 9B is a diagram showing an example of color gamut expansion by the color conversion device according to Embodiment 1 of the present invention.
Figure 9C:
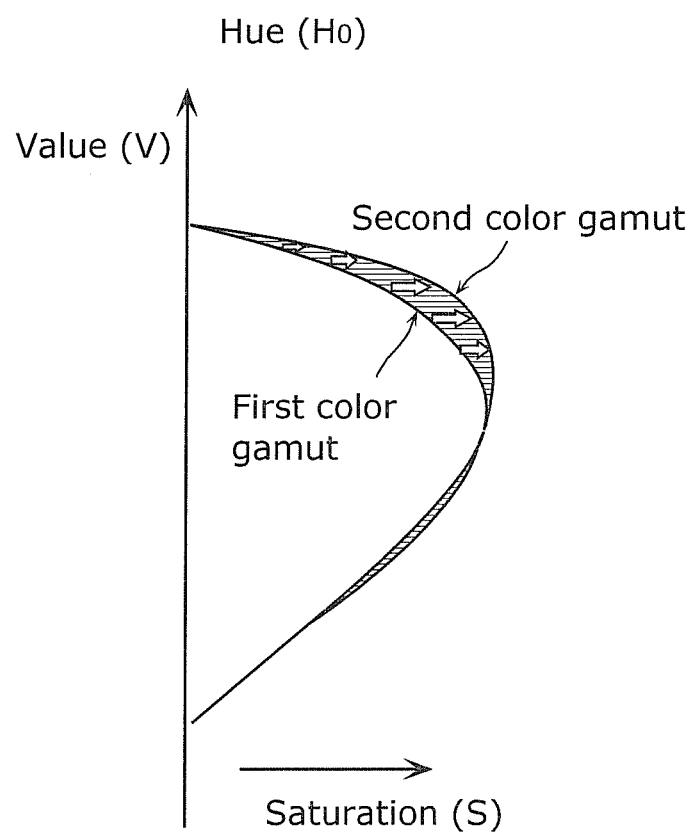
FIG. 9C is a diagram showing an example of color gamut expansion by the color conversion device according to Embodiment 1 of the present invention.

Each of FIGS. 9A to 9C is a diagram visually showing, with respect to three different hues (H0, H1, H2), a difference in area between two color gamuts and a magnitude of a mixing ratio at the time. Moreover, each of FIGS. 9A to 9C shows a case where the first color gamut which is a narrow color gamut is expanded to the second color gamut which is a color gamut broader than the first color gamut. Furthermore, in FIGS. 9A to 9C, a shaded area indicates the difference in area between the two color gamuts. As exactly indicated by a size of white arrow, the mixing ratio of the input color data 21 (RGB) is set higher as the shaded area is broader. For instance, the difference in area between the two color gamuts is relatively large in the hue H2 shown in FIG. 9A, the difference in area between the two color gamuts is relatively small in the hue H0 shown in FIG. 9C, and the difference in area between the two color gamuts is intermediate between the cases of the hues H0 and H2 in the hue H1 shown in FIG. 9B.

More specifically, the following describes setting of a mixing ratio r corresponding to a magnitude of the saturation (S) at value (e.g., the value (V) indicated by a vertical axis in FIGS. 9A to 9C) of a hue (e.g., H0 to H2 in FIGS. 9A to 9C). FIG. 4 shows a value of the mixing ratio r corresponding to the saturation (S) when the difference in area between the two color gamuts is small (e.g., a ratio of the second color gamut to the first color gamut is equal to or below 1.2). In this case, the mixing ratio r is set so that a threshold value of the saturation (S) at r=0.5 where proportions of mixing between the input color data 21 (RGB) and the first converted color data 22 (R'G'B') are equal to each other is $S_0$. In other words, the mixing ratio r is set so that a proportion of the input color data 21 (RGB) abruptly increases from the threshold value $S_0$ of the quite high saturation (S).

Furthermore, FIG. 5 shows a value of the mixing ratio r corresponding to the saturation (S) when the difference in area between the two color gamuts is intermediate (e.g., the ratio of the second color gamut to the first color gamut is 1.2 to 1.5). In this case, the mixing ratio r is set so that a threshold value of the saturation (S) when the mixing ratio r=0.5 is $S_1$. In other words, the mixing ratio r is set so that the proportion of the input color data 21 (RGB) gradually increases from the threshold value $S_1$ of the intermediate saturation (S).

Moreover, FIG. 6 shows a value of the mixing ratio r corresponding to the saturation (S) when the difference in area between the two color gamuts is large (e.g., the ratio of the second color gamut to the first color gamut is above 1.5). In this case, the mixing ratio r is set so that a threshold value of the saturation (S) at r=0.5 is $S_2$. In other words, the mixing ratio r is set so that the proportion of the input color data 21 (RGB) abruptly increases from the threshold value $S_2$ of the quite small saturation (S).

As stated above, the input color data 21 is used as the color data 23 in the broader color gamut as the difference in area between the two color gamuts is greater. In addition, when a comparison is made on the same saturation (S), the mixing ratio of the input color data 21 increases with an increase in the difference in area between the two color gamuts.

Furthermore, as stated above, the value of the mixing ratio r corresponding to the saturation (S) is set for each of pairs of the hue (H) and the value (V) (a vertical axis in FIGS. 9A to 9C) as shown in FIGS. 4 to 6.

It is to be noted that in the preservation color range in which it is desired not to change the coloration such as the human skin color as much as possible, the ratio for mixing the first converted color data 22 (R'G'B') is set higher. For instance, in the case of the human skin color, when color data is in a range where the hue (H) is in a red, yellow, and magenta color range and the value (V) is at an intermediate to high level, the mixing ratio of the first converted color data 22 (R'G'B') is increased, and conversely the mixing ratio of the input color data 21 (RGB) is decreased. In addition, the threshold value of the saturation (S) is set so that a threshold value of the saturation (S) when the mixing ratio r=0.5 is in a range of 0.5 to 0.8.

It is to be noted that although a sigmoid nonlinear function is employed as a function of the above-described mixing ratio r in the present embodiment, the function may be a linear function.

Next, each of FIGS. 10A to 10C and 11 shows an example of (i) the color data 23 obtained by mixing the input color data 20 (RGB) and the first converted color data 22 (R'G'B') that is mapped (the above-described chromaticity preservation mapping) and (ii) a chromaticity point of the color data 23.

FIG. 10A is a diagram showing 8-bit input color data 20 (RGB) in sRGB format which is the first color gamut, and a Yxy chromaticity value 30 obtained by performing first an inverse gamma conversion on the input color data 20 (RGB) and then an XYZ conversion on the converted input color data 20 using Expression 6. FIG. 10B is a diagram showing a value of first converted color data 22 (R'G'B') that is converted to 8-bit R'G'B' ranging from 0 to 255 by converting, using Expression 2, the Yxy chromaticity value 30 after the XYZ conversion into AdobeRGB which is the second color gamut, and further performing a gamma conversion on the converted value. FIG. 10C is a diagram showing a value and the Yxy chromaticity value 31 of the color data 23 which is obtained by mixing, at the mixing ratio r value compliant with the above-described setting, sRGB data which is the input color data 21 and data which is mapped into AdobeRGB.

Figure 11:
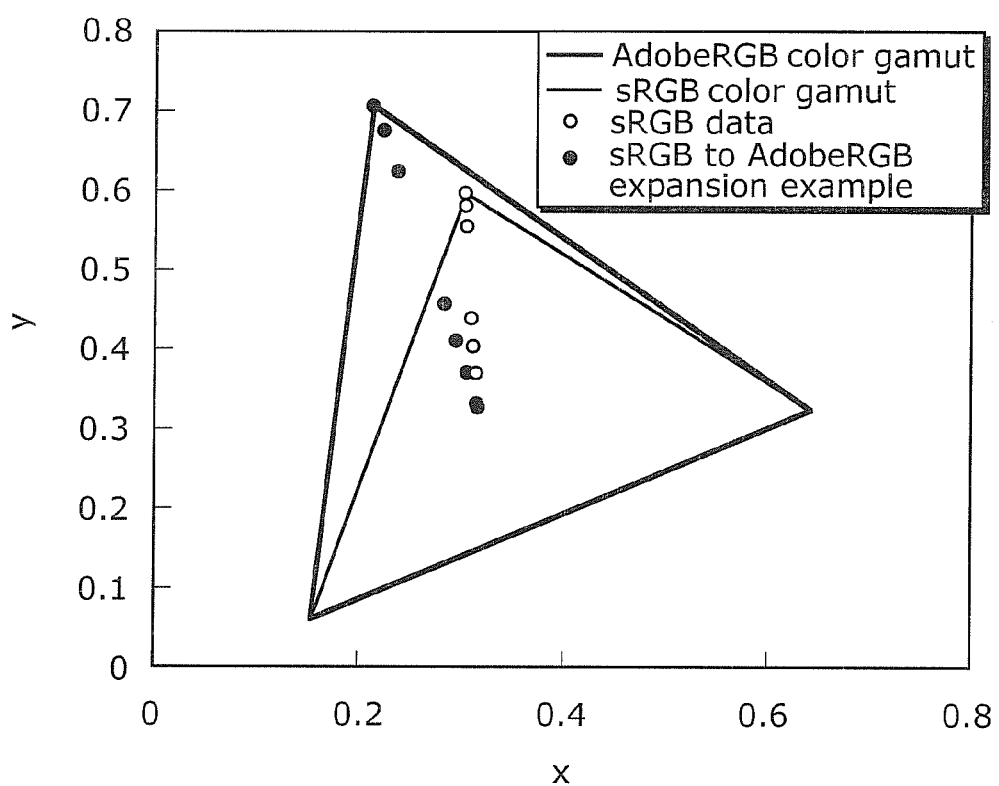
FIG. 11 is a diagram showing an example of color gamut expansion by the color conversion device according to Embodiment 1 of the present invention.

The sRGB data (input color data 20) which is shown in the above-described FIG. 10A indicates sample data when a green (G) level value is changed and Y indicating value is maintained constant as much as possible. FIG. 11 shows comparison of a result of the color gamut expansion conversion using xy chromaticity values. In FIG. 11, a white dot indicates an xy value (a Yxy chromaticity value 30 in FIG. 10A) of the sRGB data in the first color gamut, and a black dot indicates an xy value (a Yxy chromaticity value 31 in FIG. 10C) of data obtained by expanding the sRGB data in the first color gamut to AdobeRGB data in the second color gamut. As stated above, the result of the color gamut expansion from sRGB to AdobeRGB is that a chromaticity value in a vicinity of white close to the human skin color is hardly displaced, relative color relationships remain unchanged, and continuity of color gradation is maintained.

The color data output unit 13 outputs, as color data 24, the color data 23 generated by the color mixing unit 12. The color data output unit 13 outputs the color data 24 to an output device such as a display, projector, or printer. The output device is a display having an AdobeRGB color gamut in the above-described embodiment.

It is to be noted that although the above-described embodiment has described the color gamut expansion from the sRGB color gamut to the AdobeRGB color gamut, it goes without saying that conversion can also be performed when color gamut expansion from not only a specific color gamut such as a standard but also another narrower color gamut to a broader color gamut is performed.

Figure 12:
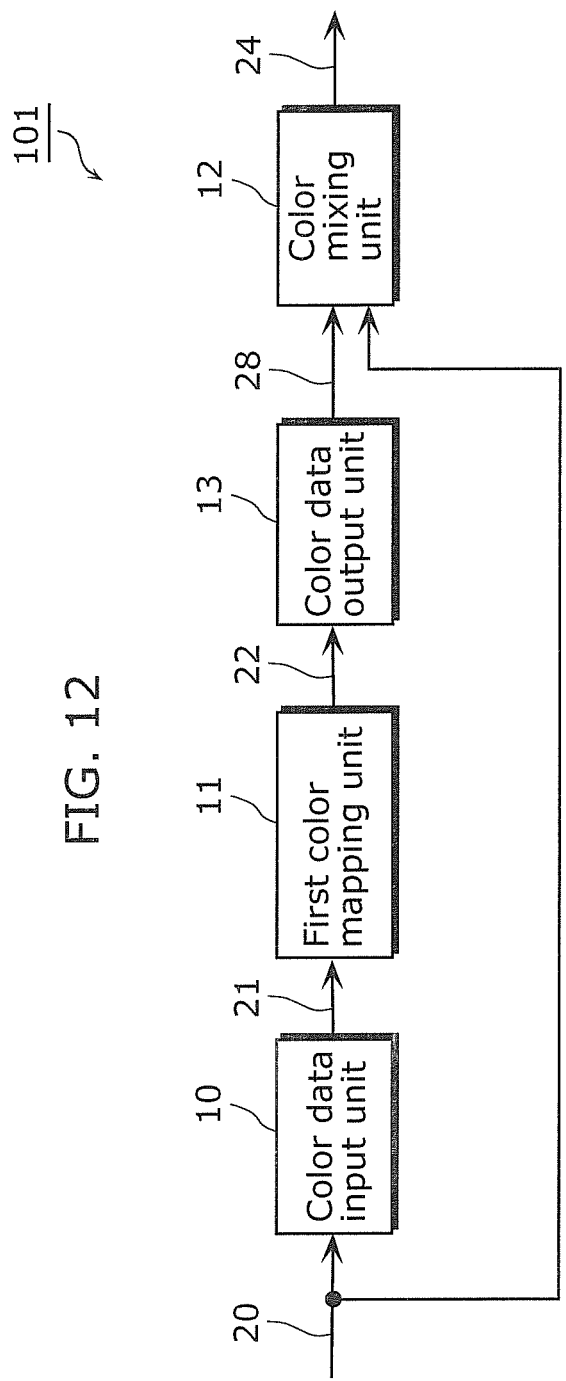
FIG. 12 is a block diagram showing a basic configuration of a modification of the color conversion device according to Embodiment 1 of the present invention.

Moreover, FIG. 12 is a block diagram showing a basic configuration of a color conversion device 101 which is a modification of the color conversion device 100 according to Embodiment 1 of the present invention. As shown in FIG. 12, the input color data 20 which is inputted from the outside and is not yet converted to the linear RGB input color may be mixed in the color mixing unit 12.

The color conversion device 101 shown in FIG. 12 includes a color data input unit 10, a first color mapping unit 11, a color data output unit 13, and a color mixing unit 12. The color data input unit 10 converts (inverse-gamma-converts) the input color data 20 inputted from the outside into the linear RGB input color data 21. The first color mapping unit 11 generates the first converted color data 22 by mapping the converted input color data 21. The color data output unit 13 generates color data 28 by converting (gamma-converting) the first converted color data 22 so that the first converted color data 22 can be displayed by the output device. The color mixing unit 12 mixes the input color data 20 which is not yet inverse-gamma-converted and the color data 28.

Furthermore, the color data input unit 10, the color mixing unit 12, and the color data output unit 13 as a whole may be configured of an LUT (lookup table), or only the color mixing unit 12 may be configured of the LUT.

As described above, the color conversion device 100 according to Embodiment 1 of the present invention outputs the input color data in a narrow color gamut as the color data 23 that is obtained by mixing the first converted color data 22 and the input color data 21, the first converted color data 22 being mapped as data within the color gamut of the output device having a broad color gamut, and the input color data 21 being outputted without being mapped and dependent on the device color gamut.

Moreover, the color conversion device 100 mainly uses the input color data whose chromaticity point remains the same, that is, the input color data 21 for the color data in which the coloration such as the human skin color should not be changed, and the first converted color data 22 that is mapped without causing the chromaticity displacement for the color data within the color gamut of the output device. Furthermore, the color conversion device 100 mainly uses the input color data 21 that is reproduced dependent on the color gamut of the output device, for the color data in the color gamut which is beyond the color gamut of the input color data 20 and is reproducible by the output device. Moreover, the color conversion device 100 moderately mixes two different color data of the input color data 21 and the first converted color data 22, based on the hue, the saturation, and the value. With these, the color conversion device 100 makes it possible to maintain the coloration such as the human skin color and the continuity of the color gradation without changing the relative color relationships in the color gamut of the output device.

The following describes a flow of color conversion processing by the color conversion device 100.

Figure 13:
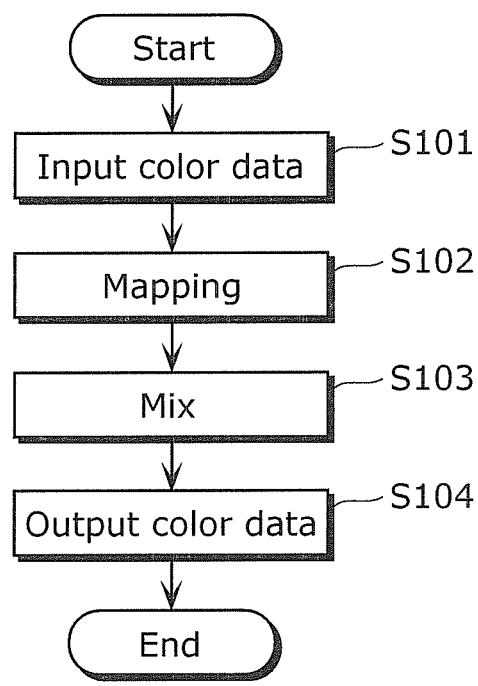
FIG. 13 is a flow chart showing a flow of color conversion processing by the color conversion device according to Embodiment 1 of the present invention.

FIG. 13 is a flow chart showing a flow of color conversion processing by the color conversion device 100.

As shown in FIG. 13, first, the color data input unit 10 inputs input color data 20 from the outside (S101). In addition, the color data input unit 10 converts the input color data 20 into linear input color data 21.

Next, the first color mapping unit 11 generates first converted color data 22 by mapping, into color data within a color gamut of output data 24, the input color data 21 converted by the color data input unit 10 (S102).

More specifically, in the case of color gamut compression, the first color mapping unit 11 maps, within a second color gamut, the input color data 21 without causing chromaticity displacement when the input color data 21 is within the second color gamut, and maps the input color data 21 to a color gamut boundary of the second color gamut when the input color data 21 is out of the second color gamut. Moreover, in the case of the color gamut compression, the first color mapping unit 11 maps, within the second color gamut, the input color data 21 without causing the chromaticity displacement.

Next, the color mixing unit 12 generates color data 23 by mixing the input color data 21 and the first converted color data 22 at a ratio corresponding to a first color gamut and the second color gamut (S103). More specifically, the color mixing unit 12 mixes the input color data 21 and the first converted color data 22 so that a proportion of the input color data 21 increases with an increase in a difference in area between the first color gamut and the second color gamut in terms of hue and value of the input color data 21.

Next, the color data output unit 13 outputs, to the output device, the color data 23 as the color data 24 (S104).

(Embodiment 2)

A color conversion device according to Embodiment 2 of the present invention is a modification of the color conversion device 100 according to the above-described Embodiment 1 of the present invention.

It is to be noted that hereinafter, overlaps in description with the above-described Embodiment 1 are omitted, and only differences from Embodiment 1 are described.

Figure 14:
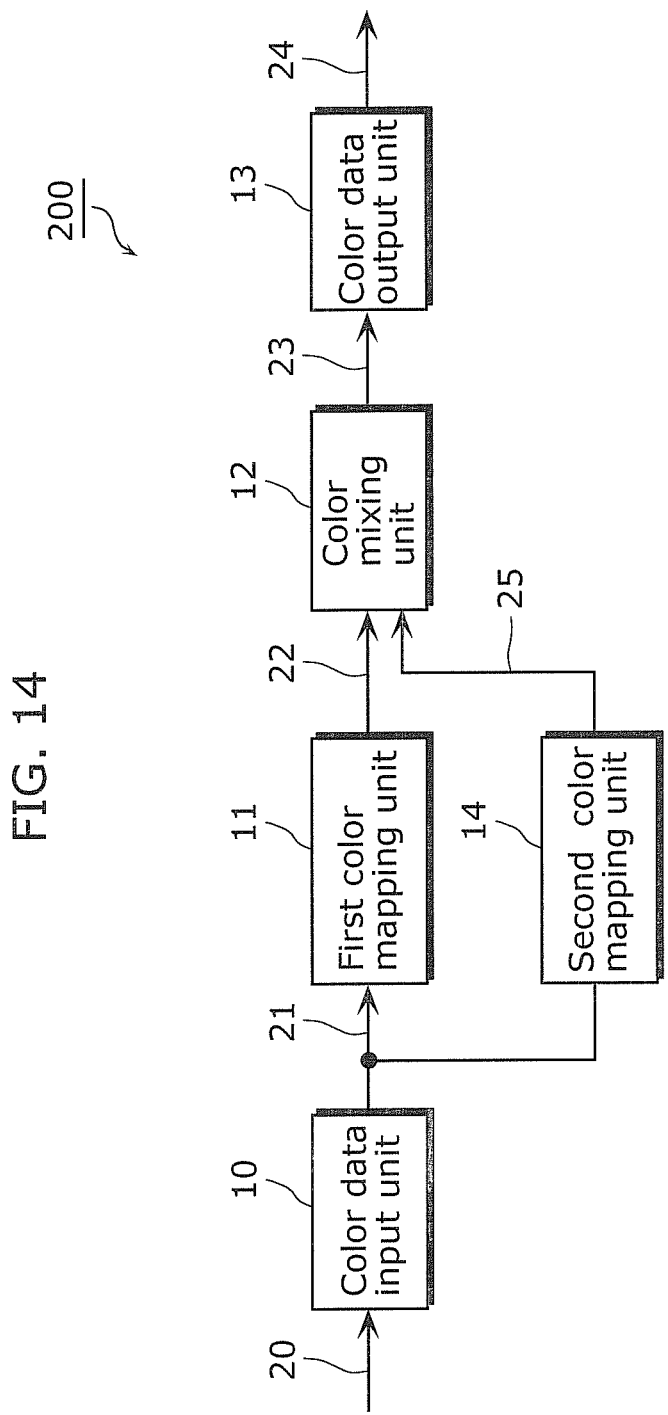
FIG. 14 is a block diagram showing a basic configuration of a color conversion device according to Embodiment 2 of the present invention.

FIG. 14 is a block diagram showing a basic configuration of a color conversion device 200 according to Embodiment 2 of the present invention. In addition to the configuration of the color conversion device 100 according to Embodiment 1, the color conversion device 200 further includes a second color mapping unit 14 which maps, as second converted color data 25 in a second color gamut, input color data 21 outputted from the color data input unit 10.

It is to be noted that although a color gamut of an output device is either normally a second color gamut of a conversion destination or often a color gamut very similar to the second color gamut, Embodiment 2 of the present invention takes into consideration the case where the color gamut of the output device has individual variations or temporal change, and describes a case of correctly outputting color data as color data in the second color gamut assuming that the color gamut of the output device is off the second color gamut in some degree.

The second color mapping unit 14 generates the second converted color data 25 by mapping the input color data 21 into the second color gamut, and the input color data 21 is color data in the second color gamut.

Figure 15:
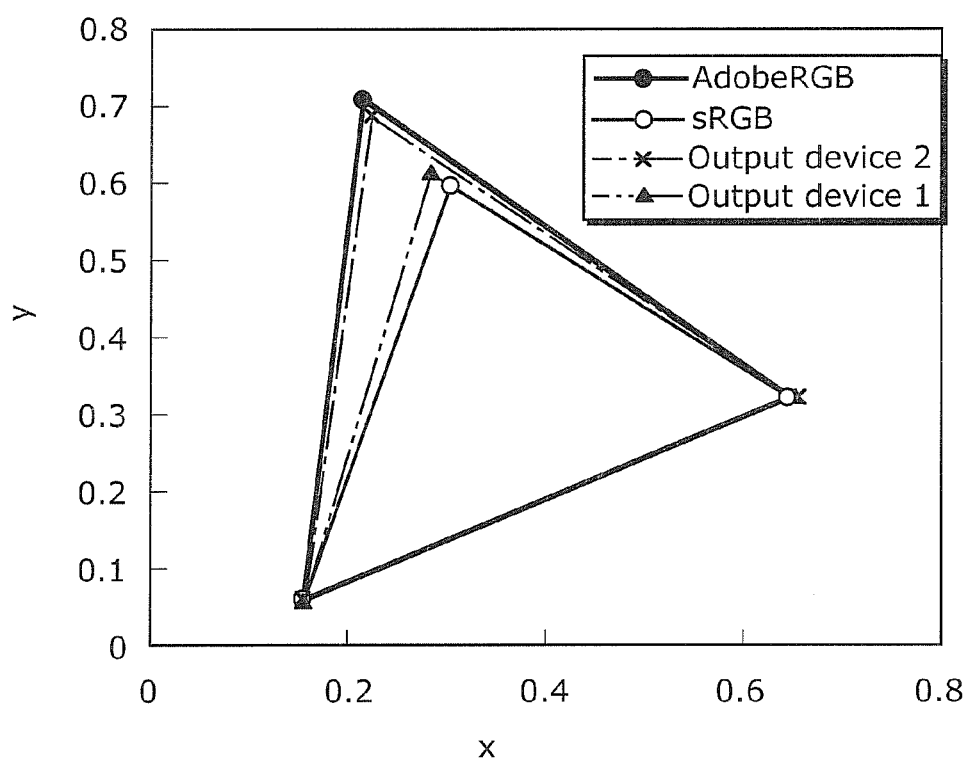
FIG. 15 is a diagram showing an example of different color gamut standards in the color conversion device according to Embodiment 2 of the present invention.

First, the following describes color gamut compression, that is, a case where a color gamut of the input color data 20 that is inputted to the color data input unit 10 is broader than the second color gamut of the conversion destination. For example, when a picture captured in AdobeRGB is outputted to a sRGB (standard RGB) display, it is necessary to compress the color gamut, because an AdodeRGB color gamut is broader than an sRGB color gamut as shown in FIG. 15. If the picture is outputted to the sRGB color gamut without color conversion, colors appear lightened and saturation appears deteriorated on the picture.

As with the above-described first color mapping unit 11, the second color mapping unit 14 temporarily converts the input color data 21 (R, G, B) into a chromaticity value (e.g., XYZ) of a device-independent color space, that is, a color space which does not depend on a device, and inversely converts, as the XYZ value in the second color gamut, the chromaticity value into original RGB color data.

More specifically, the second color mapping unit 14 converts the input color data 21 into the XYZ value using the inverse conversion of Expression 2, and then converts the converted XYZ value into the RGB color data using Expression 2. In other words, although the input color data is originally the RGB data in the AdobeRGB color gamut, the input color data is determined as the RGB data in the sRGB color gamut and converted into XYZ data, and the converted XYZ data is inversely converted into the RGB data in sRGB color gamut, which results in the same value. Thus, in this case, actually, the second color mapping unit 14 may directly output, as the second converted color data 25, the input color data 21 provided from the color data input unit 10.

It is to be noted that the second color mapping unit 14 may generate the second converted color data 25 by converting the input color data 21 (R, G, B) provided from the color data input unit 10 using Expression 1, performing, on the converted data, specific mapping which maps a predetermined chromaticity value into another predetermined chromaticity value, and then inversely converting the mapped data into the RGB data using Expression 2. To put it differently, specific mapping means that when the chromaticity value of the input color data 21 is included in a predetermined first color range of the first color gamut, the input color data 21 is mapped into color data in the second color gamut corresponding to the first color range.

For instance, the second color mapping unit 14 may perform the specific mapping which shifts especially a chromaticity value at a boundary of the first color gamut or in its vicinity to a chromaticity value at a boundary of the second color gamut or in its vicinity as much as possible. With this, the color data can be shifted within a color gamut identical or similar to the color gamut of the output device. Alternatively, for the purpose of image reproduction or image quality, the second color mapping unit 14 may perform the specific mapping which changes a specific chromaticity value in the first color gamut to a specific chromaticity value in the second color gamut so that hue, saturation, or value of a color range is changed to predetermined hue, saturation, or value. For example, the specific mapping shifts the blue color of the sky to a bluer chromaticity value than in reality. In these cases, the input data 21 is different from the second converted color data 25.

The color mixing unit 12 generates the color data 23 by mixing the first converted color data 22 (R1, G1, B1) mapped by the first color mapping unit 11 and the second converted color data 25 (R2, G2, B2) mapped by the second color mapping unit 14.

Here, the color mixing unit 12 mixes the first converted color data 22 and the second converted color data 25 so that a proportion of the compression-clipped first converted color data 22 (R1, G1, B1) is as high as possible for the color such as the human skin color which gives people a feeling of strangeness when its coloration is changed, and conversely so that the a proportion of the second converted color data 25 (R2, G2, B2) is higher for the color at the boundary of the second color gamut and in its vicinity.

As a specific mixing method, for instance, when the second converted color data 25 (R2, G2, B2) is the same as the input color data 21 (R, G, B), the color mixing unit 12 first calculates hue (H), saturation (S), and value (V) from the second converted color data 25 (R2, G2, B2). For example, the color mixing unit 12 employs Expression 5 or Expressions 3 and 4.

Figure 16:
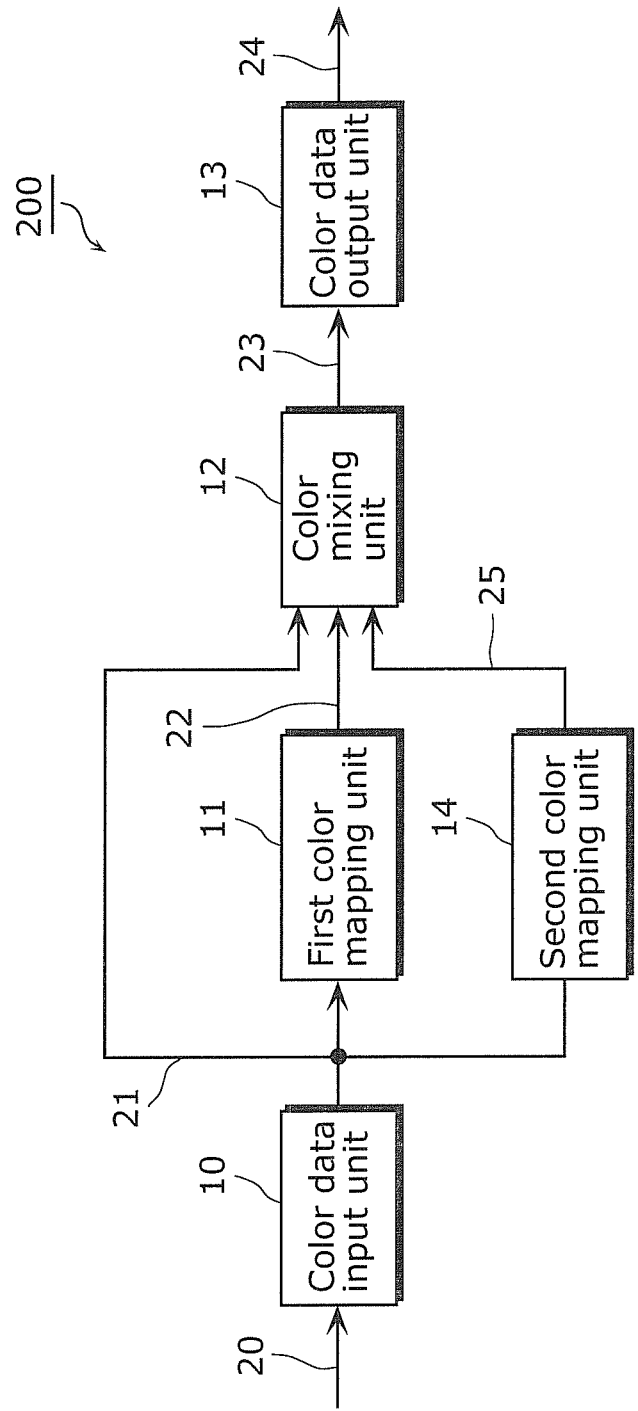
FIG. 16 is a block diagram showing a basic configuration of a modification of the color conversion device according to Embodiment 2 of the present invention.

It is to be noted that when the second converted color data 25 (R2, G2, B2) is different from the input color data 21 (R, G, B), that is, when the second color mapping unit 14 performs the above-described specific mapping, as shown in FIG. 16, the color mixing unit 12 acquires the input color data 21 from the color data input unit 10, and calculates hue (H), saturation (S), and value (V) from the input color data 21 (R, G, B).

Furthermore, a method for setting a mixing ratio r by the color mixing unit 12 when the second converted color data 25 (R2, G2, B2) is the same as the input color data 21 (R, G, B) is the same as in Embodiment 1, and thus description of the method is omitted.

It is to be noted that although the above-described mixing ratio is basically observed when the second color mapping unit 14 performs the above-described specific mapping, a mixing ratio of the second converted color data 25 (R2, G2, B2) is set higher for a mapping range especially set by the specific mapping.

Moreover, the method for setting a mixing ratio r by the color mixing unit 12 when the second converted color data 25 (R2, G2, B2) is the same as the input color data 21 (R, G, B) is the same as in Embodiment 1, and thus description of the method is omitted.

Furthermore, an example of (i) the color data 23 obtained by mixing the first converted color data 22 (R1, G1, B1) and the second converted color data 25 (R2, G2, B2) and (ii) a chromaticity point of the same when the second converted color data 25 (R2, G2, B2) is the same as the input color data 21 (R, G, B) is the same as in FIGS. 7A to 7C and 8, and thus their description is omitted.

The following describes a case where the color data output unit 13 outputs the color data 24 to the output device 1 which is off the second color gamut in some degree, assuming a case where the color gamut of the output device has individual variations or temporal change.

Figure 18:
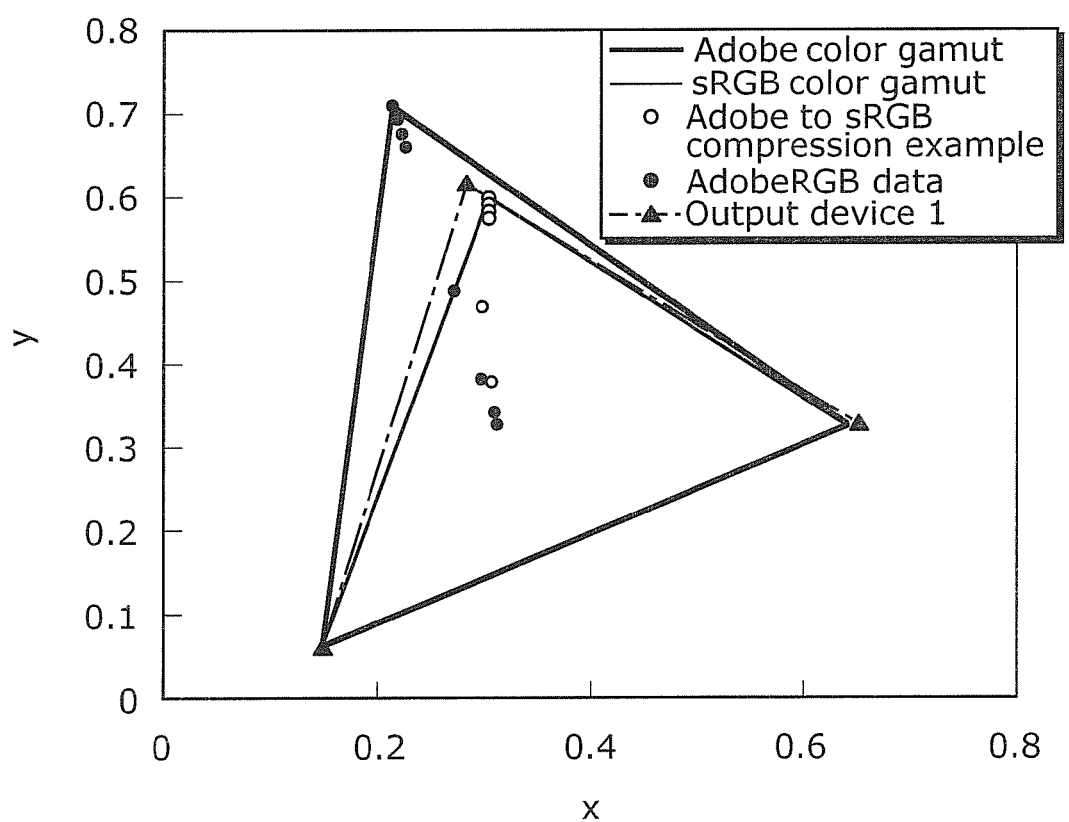
FIG. 18 is a diagram showing an example of color gamut compression by the color conversion device according to Embodiment 2 of the present invention.

FIGS. 17A to 17D are diagrams showing xy values of chromaticity coordinates of the RGB three primary colors of AdobeRGB, sRGB, the output device 1, and the output device 2, respectively. FIG. 18 is a diagram showing color gamuts of AdobeRGB, sRGB, and the output device 1.

For instance, assuming that the color gamut of the output device 1 is indicated by the xy values of the chromaticity coordinates of the RGB three primary colors shown in FIG. 17C, when the color data 23 is correctly outputted as the color data in the second color gamut, the color data output unit 13 generates the RGB data by first converting an xy value (a Yxy chromaticity value 31 shown in FIG. 7C) of the color data 23 into XYZ and then performing conversion using Expression 8, performs gamma conversion on the generated RGB data, and subsequently converts the RGB data into an 8-bit RGB value. With this, for example, the color data output unit 13 generates the color data 24 (R, G, B) shown in FIG. 19.

Expression 8

$$\begin{bmatrix} R \\ G \\ B \end{bmatrix} = \begin{bmatrix} 2.1221 & -0.6303 & -0.3551 \\ -0.9426 & 1.8544 & 0.0381 \\ 0.0429 & -0.1461 & 1.0149 \end{bmatrix} \begin{bmatrix} X \\ Y \\ Z \end{bmatrix}$$ [Math. 8]

It is to be noted that although the above-described embodiment has described the color gamut compression from the AdobeRGB color gamut into the sRGB color gamut, it goes without saying that conversion can also be performed when color gamut compression from not only a specific color gamut such as a standard but also another broader color gamut into a narrower color gamut is performed. Furthermore, when the color gamut of the output device is very similar to the above-described second color gamut (e.g., when a color difference cannot be visually distinguished), the color data output unit 13 may directly output, as the color data 24, the color data 23 to the output device.

As described above, when the input color data 20 in the first color gamut is converted into the color data in the second color gamut which is broader than the first color gamut, that is, when the color gamut of the input color data 20 is broader than the second color gamut of the color data 24, the color conversion device 200 according to Embodiment 2 of the present invention outputs the color data 23 obtained by mixing the first converted color data 22 and the second converted color data 25 (the same as the input color data 21), the first converted color data 22 being obtained by compression-mapping the input color data 21 into the second color gamut, and the second converted color data 25 being obtained by mapping, as the color data in the second color gamut, the input color data 21 into the second color gamut. Alternatively, the color conversion device 200 outputs the color data 23 obtained by mixing the first converted color data 22 and the second converted color data (different from the input color data 21), the first converted color data 22 being obtained by compression-mapping the input color data 21 into the second color gamut, and the second converted color data being obtained by mapping the input color data 21 into a specific color in the second color gamut.

At this time, the color conversion device 200 mainly uses the first converted color data 22 which is reproducible color data within a color gamut, that is, color data obtained by the compression-mapping, for the color data in which the coloration such as the human skin color should not be changed. Moreover, the color conversion device 200 mainly uses either input color data which is reproduced dependent on the second color gamut or color data which is mapped into a specific color, for the input color data 21 out of the second color gamut. Furthermore, the color conversion device 200 moderately mixes the first converted color data 22 and the second converted color data 25 based on the hue, the saturation, and the value, and outputs the mixed data. With these, the color conversion device 200 makes it possible to maintain the continuity of the color gradation without changing the coloration such as the human skin color or the color relationships in the color gamut of the output device.

The following describes the color gamut expansion, that is, the case where the color gamut of the input color data 20 is narrower than the second color gamut. For example, there is a case where, contrary to the above-described color gamut compression, a picture captured in sRGB format is outputted to an AdobeRGB display. In this case, as shown in FIG. 15, the AdobeRGB color gamut is broader than the sRGB color gamut, and thus the color gamut needs expanding. Although colors in an expanded color gamut area appear vivid when the picture is outputted to the AdobeRGB color gamut without being processed, there are cases where it gives people a feeling of strangeness, because overall color balance is lost and coloration is changed.

Although the color gamut expansion does not differ from the above-described color gamut compression in the overall basic configuration, each of components constituting the basic configuration differs in some degree. As a result, the following mainly describes especially differences of the color gamut expansion. It is to be noted that hereinafter, contrary to the example of the above-described color gamut compression, the present embodiment describes color gamut conversion from sRGB into AdobeRGB.

As with the above-described color gamut compression, the second color mapping unit 14 temporarily converts the input color data 21 (R, G, B) into the device-independent color space which is the color space independent of the device, for instance, the XYZ chromaticity value, and in turn inversely converts the color space into the original RGB color data with the chromaticity value being XYZ within the second color gamut.

More specifically, the second color mapping unit 14 converts the input color data 21 into the XYZ value using the inverse conversion of Expression 7, and then converts the XYZ value into the RGB color data using Expression 7. In other words, although the input color data 21 is originally the RGB data in the sRGB color gamut, the input color data 21 is determined as RGB data in an sAdobeRGB color gamut and converted into the XYZ value, and the XYZ value is inversely converted into the RGB data in the AdobeRGB color gamut, which results in the same value. Thus, in this case, actually, the second color mapping unit 14 may directly output, as the second converted color data 25 (R2, G2, B2), the input color data 21 (R, G, B) provided from the color data input unit 10. In this case, the input color data 21 (R, G, B) is the same as the second converted color data 25 (R2, G2, B2).

It is to be noted that the second color mapping unit 14 may generate the second converted color data 25 by converting the input color data 21 (R, G, B) provided from the color data input unit 10 using Expression 6, performing specific mapping which maps a predetermined chromaticity value into another predetermined chromaticity value, and then inversely converting the another chromaticity value into the RGB data using Expression 7. For instance, the second color mapping unit 14 may perform the specific mapping which shifts especially a chromaticity value at a boundary of the first color gamut or in its vicinity to a chromaticity value at a boundary of the second color gamut or in its vicinity as much as possible. With this, the color data can be shifted within a color gamut identical or similar to the color gamut of the output device. Alternatively, for a purpose of image reproduction or image quality, the second color mapping unit 14 may perform the specific mapping which changes a specific chromaticity value in the first color gamut to a specific chromaticity value in the second color gamut so that hue, saturation, or value of a color range is changed to predetermined hue, saturation, or value. For example, the specific mapping shifts the blue color of the sky to a bluer chromaticity value more than in reality. In these cases, the input data 21 is different from the second converted color data 25.

The color mixing unit 12 generates the color data 23 by mixing the above-described first converted color data 22 (R1, G1, B1) and the above-described second converted color data 25 (R2, G2, B2).

Here, the color mixing unit 12 sets a proportion of the first converted color data 22 (R1, G1, B1) to be higher for the color which gives people a feeling of strangeness when its coloration is changed, the first converted color data 22 being chromaticity preservation mapped. In addition, the color mixing unit 12 sets a proportion of the second converted color data 25 (R2, G2, B2) to be higher for the color at the boundary of the color gamut or in its vicinity as much as possible, the second converted color data 25 having high saturation and vividness.

In the same manner as the above-described color gamut compression, as a specific mixing method, when the second converted color data 25 (R2, G2, B2) is the same as the input color data 21 (R, G, B), the color mixing unit 12 first calculates hue (H), saturation (S), and value (V) from the second converted color data 25 (R2, G2, B2). It is to be noted that when the second converted color data 25 (R2, G2, B2) is different from the input color data 21 (R, G, B), that is, when the second color mapping unit 14 performs the above-described specific mapping, as shown in FIG. 16, the color mixing unit 12 acquires the input color data 21 from the color data input unit 10, and calculates the hue (H), the saturation (S), and the value (V) using the input color data 21 (R, G, B).

Moreover, the method for setting a mixing ratio r by the color mixing unit 12 when the second converted color data 25 (R2, G2, B2) is the same as the input color data 21 (R, G, B) is the same as in Embodiment 1, and thus description of the method is omitted.

It is to be noted that although the above-described mixing ratio is basically observed when the second color mapping unit 14 performs the above-described specific mapping, a mixing ratio of the second converted color data 25 (R2, G2, B2) is set higher for a mapping range especially set in the specific mapping.

Furthermore, the method for setting a mixing ratio r by the color mixing unit 12 when the second converted color data 25 (R2, G2, B2) is the same as the input color data 21 (R, G, B) is the same as in Embodiment 1, and thus description of the method is omitted.

Moreover, an example of (i) the color data 23 obtained by mixing the first converted color data (R1, G1, B1) and the second converted color data 25 (R2, G2, B2) and (ii) a chromaticity point of the same when the second converted color data 25 (R2, G2, B2) is the same as the input color data 21 (R, G, B) is the same as in FIGS. 10A to 10C and 11, and thus their description is omitted.

The following describes a case where the color data output unit 13 outputs the color data 24 to the output device 2 which is off the second color gamut in some degree, assuming a case where the color gamut of the output device has individual variations or temporal change.

Figure 20:
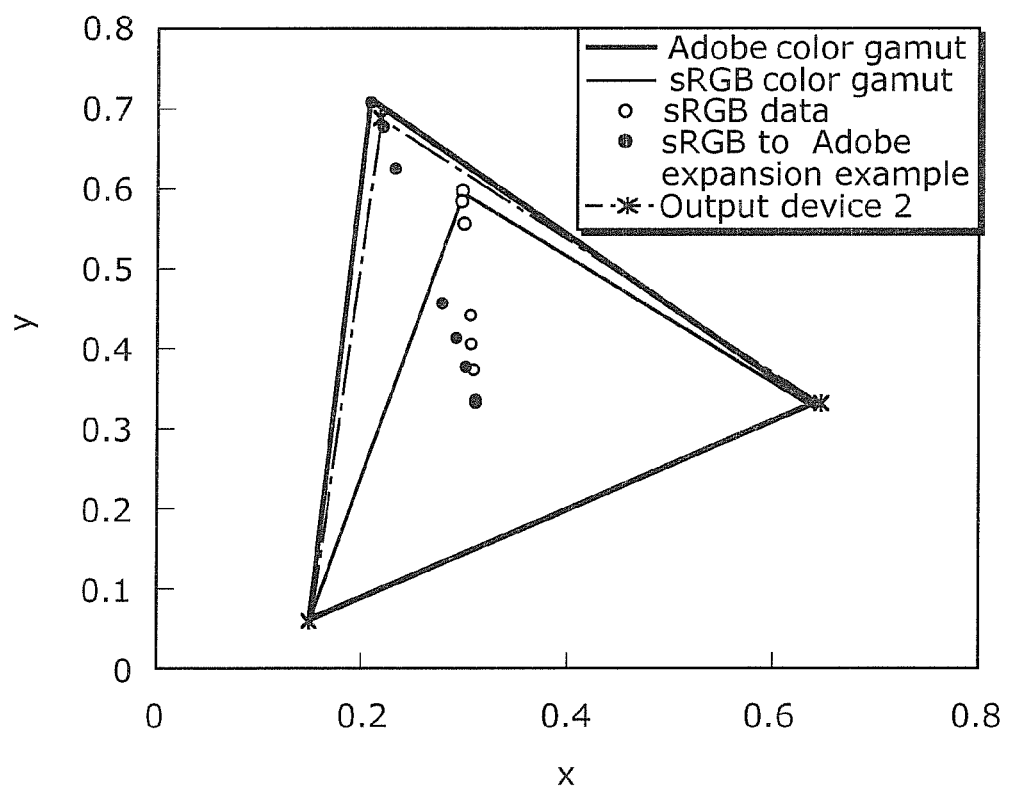
FIG. 20 is a diagram showing an example of color gamut expansion by the color conversion device according to Embodiment 2 of the present invention.

FIG. 20 is a diagram showing color gamuts of AdobeRGB, sRGB, and the output device 2.

For instance, assuming that the color gamut of the output device 2 is indicated by the xy values of the chromaticity coordinates of the RGB three primary colors shown in FIG. 17D, when the color data 23 is correctly outputted as the color data in the second color gamut, the color data output unit 13 generates RGB data by first converting an xy value (a Yxy chromaticity value 31 shown in FIG. 10C) of the color data 23 into XYZ and then performing conversion using Expression 9 indicated below, performs gamma conversion on the generated RGB data, and subsequently converts the RGB data into an 8-bit RGB value. With this, for example, the color data output unit 13 generates the color data 24 (R, G, B) shown in FIG. 21.

Expression 9

$$\begin{bmatrix} R \\ G \\ B \end{bmatrix} = \begin{bmatrix} 2.8351 & -1.2084 & -0.4465 \\ -0.9426 & 1.8544 & 0.0381 \\ 0.0690 & -0.1990 & 1.0407 \end{bmatrix} \begin{bmatrix} X \\ Y \\ Z \end{bmatrix} \quad \text{[Math. 9]}$$

However, in this case, a value of R, G, or B converted using Expression 9 is clipped to 0 when the value becomes equal to or below 0, because a color gamut of the output device 2 is little narrower than the AdobeRGB color gamut. Consequently, there is a case where the color gradation is saturated. As a countermeasure, the continuity of the color gradation can be maintained by replacing the color gamut of the output device 2 with the above-described second color gamut, though accuracy of the chromaticity is slightly reduced at the boundary of the second color gamut.

It is to be noted that although the above-described embodiment has described the color gamut expansion from the sRGB color gamut to the AdobeRGB color gamut, it goes without saying that conversion can be also performed when color gamut expansion from not only a specific color gamut such as a standard but also another narrower color gamut to a broader color gamut is performed. Furthermore, when the color gamut of the output device is very similar to the above-described second color gamut (e.g., when a color difference cannot be visually distinguished), the color data output unit 13 may directly output, as the color data 24, the color data 23 to the output device.

As described above, when the input color data 20 in the first color gamut is converted into the color data in the second color gamut which is broader than the first color gamut, that is, when the color gamut of the input color data 20 is narrower than the second color gamut of the color data 24, the color conversion device 200 according to Embodiment 2 of the present invention outputs the color data 23 obtained by mixing the first converted color data 22 and the second converted color data 25 (the same as the input color data 21), the first converted color data 22 being obtained by chromaticity preservation mapping, into the second color gamut, the input color data 21 as the chromaticity of the first color gamut without causing chromaticity displacement of the input color data 21, and the second converted color data 25 being obtained by mapping, into the second color gamut, the input color data 21 as the color data in the second color gamut. Alternatively, the color conversion device 200 outputs the color data 23 obtained by mixing the first converted color data 22 and the second converted color data 25 (different from the input color data 21), the first converted color data 22 being obtained by chromaticity preservation mapping the input color data 21, and the second converted color data 25 being obtained by mapping the input color data 21 into a specific color in the second color gamut.

At this time, the color conversion device 200 mainly uses the first converted color data 22 obtained by the chromaticity preservation mapping for the color data in which the coloration such as the human skin color should not be changed. Moreover, the color conversion device 200 mainly uses either input color data which is reproduced dependent on the second color gamut or color data which is mapped into a specific color, for a color gamut beyond the first color gamut. Furthermore, the color conversion device 200 moderately mixes the first converted color data 22 and the second converted color data 25 based on the hue, the saturation, and the value, and outputs the mixed data. With these, the color conversion device 200 makes it possible to maintain the continuity of the color gradation without changing the coloration such as the human skin color or the color relationships in the color gamut of the output device.

The following describes a flow of color conversion processing by the color conversion device 200.

Figure 22:
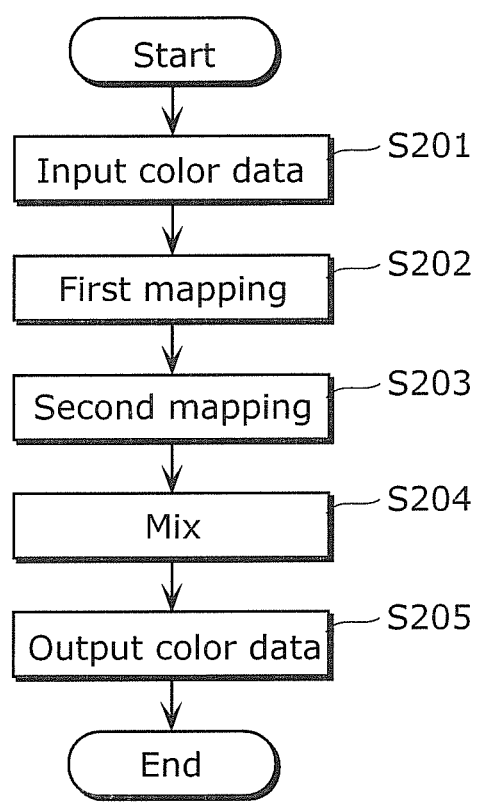
FIG. 22 is a flow chart showing a flow of color conversion processing by the color conversion device according to Embodiment 2 of the present invention.

FIG. 22 is a flow chart showing a flow of color conversion processing by the color conversion device 200.

As shown in FIG. 22, first, the color data input unit 10 inputs input color data 20 from the outside (S201). In addition, the color data input unit 10 converts the input color data 20 into linear input color data 21.

Next, the first color mapping unit 11 generates first converted color data 22 by mapping, into color data within a color gamut of output data 24, the input color data 21 converted by the color data input unit 10 (S202).

Furthermore, the second color mapping unit 14 generates second converted color data 25 by mapping the input color data 21, and the input color data 21 converted by the color data input unit 10 is the color data within the color gamut of the color data 24 (S203).

Next, the color mixing unit 12 generates color data 23 by mixing the first converted color data 22 and the second converted color data 25 (S204).

Next, the color data output unit 13 outputs, to an output device, the color data 23 as the color data 24 (S205).

It is to be noted that the steps S202 and S203 may be in any order, and the step S203 may be performed before the step S202 or the steps S202 and S203 may be performed simultaneously.

It is to be noted that as with the modification (FIG. 12) of the color conversion device 100 according to Embodiment 1, the color data output unit 13 may perform conversion (gamma conversion) so that the first converted color data 22 and the second converted color data 25 can be displayed by the output device, and the color mixing unit 12 may mix the converted two data items.

(Embodiment 3)

A color conversion device according to Embodiment 3 of the present invention is a modification of the color conversion device 100 according to the above-described Embodiment 2 of the present invention.

It is to be noted that hereinafter, overlaps in description with the above-described Embodiment 1 or 2 are omitted, and only differences from Embodiment 1 or 2 are described.

Figure 23:
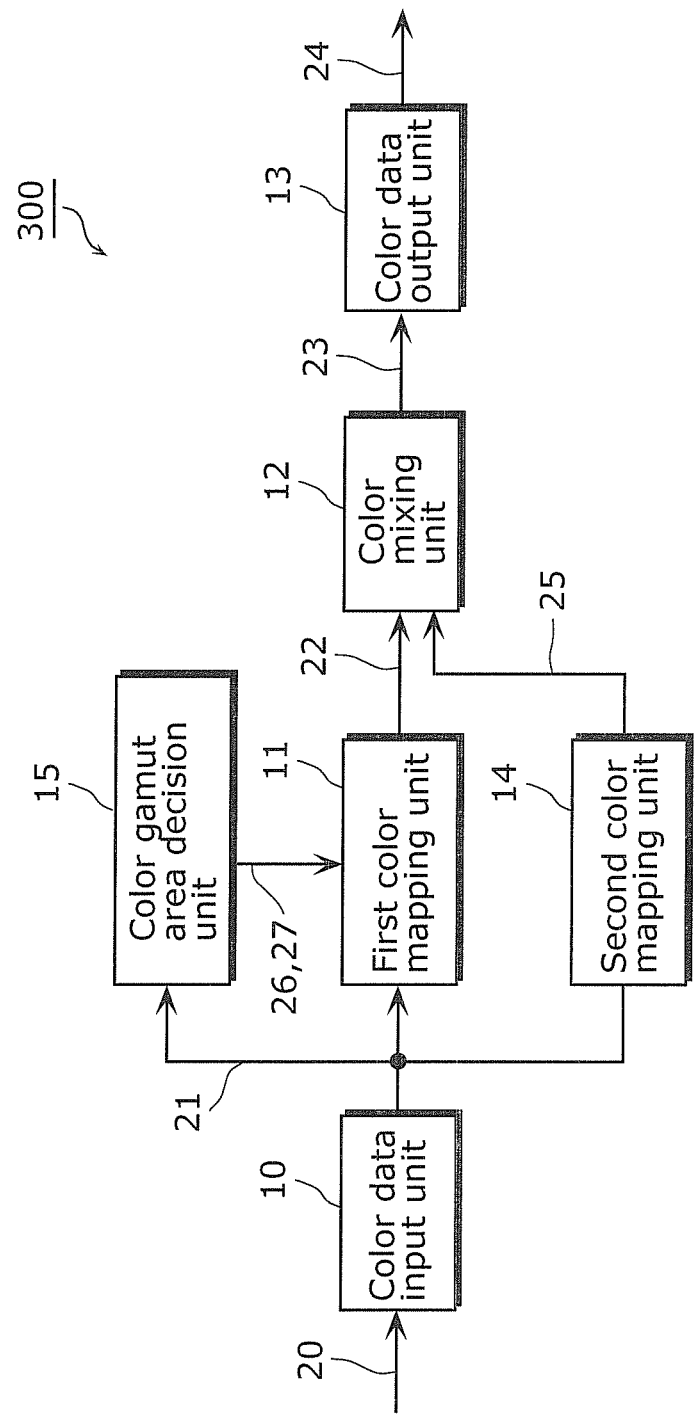
FIG. 23 is a block diagram showing a basic configuration of a color conversion device according to Embodiment 3 of the present invention.

FIG. 23 is a block diagram showing a basic configuration of a color conversion device 300 according to Embodiment 3 of the present invention. In addition to the configuration of the color conversion device 100 according to Embodiment 1, the color conversion device 300 further includes a color gamut area decision unit 15 which decides whether or not a color gamut of input color data 21 is a color gamut area included in converted second color gamut. In addition, the first color mapping unit 11 functions differently from the first color mapping unit 11 in Embodiment 2.

It is to be noted that, here, a case is assumed where a color gamut of an output device of the color data output unit 13 is normally the second color gamut of a conversion destination or a color gamut (for which a difference in color gamut cannot be visually distinguished) very similar to the second color gamut.

Figure 24:
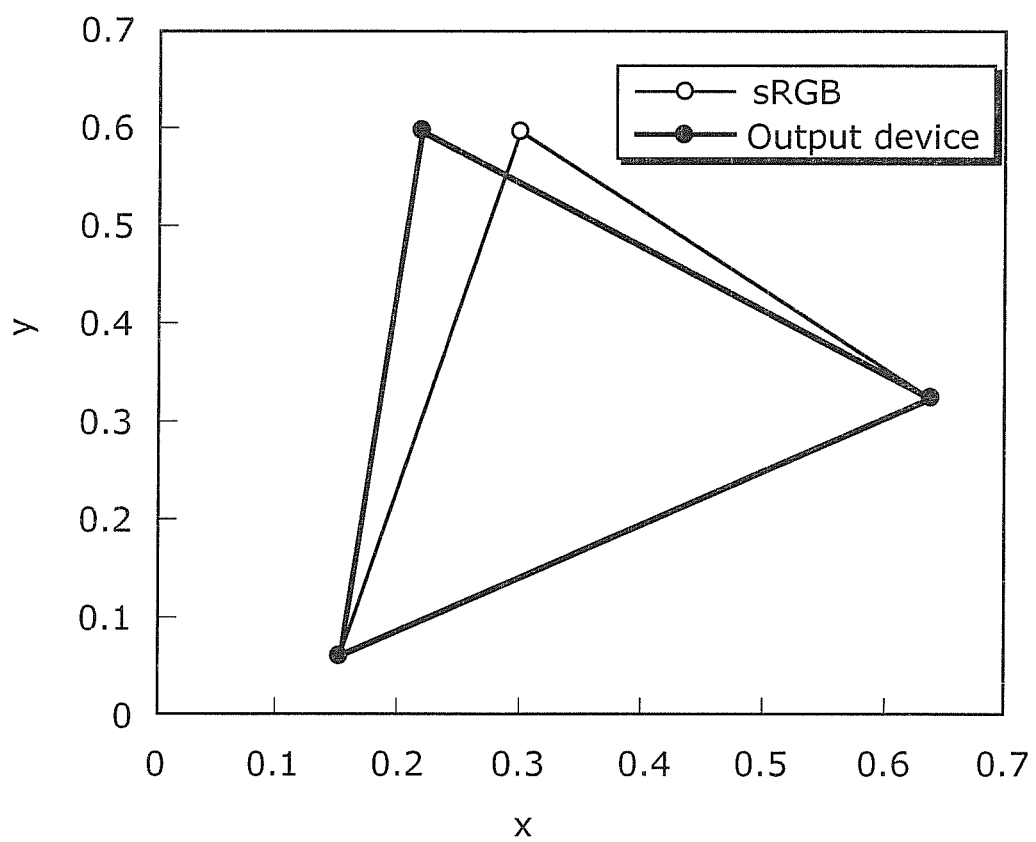
FIG. 24 is a diagram showing an example of different color gamut standards in the color conversion device according to Embodiment 3 of the present invention.

The following describes, as an example, a case where each of the first color gamut and the second color gamut, that is, an sRGB (standard RGB) color gamut and a color gamut of an output device shown in FIG. 24, is indicated by a chromaticity value of xy (hereinafter, xy chromaticity value). As shown in FIG. 24, the sRGB color gamut and the color gamut of the output device do not match with each other. In other words, the sRGB color gamut is broader than the color gamut of the output device in a color range such as yellow, and the color gamut of the output device is broader than the sRGB color gamut in a color range such as cyan.

As shown in FIG. 24, when input color data in sRGB, which is the first color gamut, cannot be completely covered by the color gamut of the output device, which is the second color gamut, the color gamut compression is performed on a color gamut in a part of a color range, and a color reproduction range, color gradation, and color continuity deteriorate when the color gamut expansion is not performed on a color gamut in another part of the color range.

Figure 25:
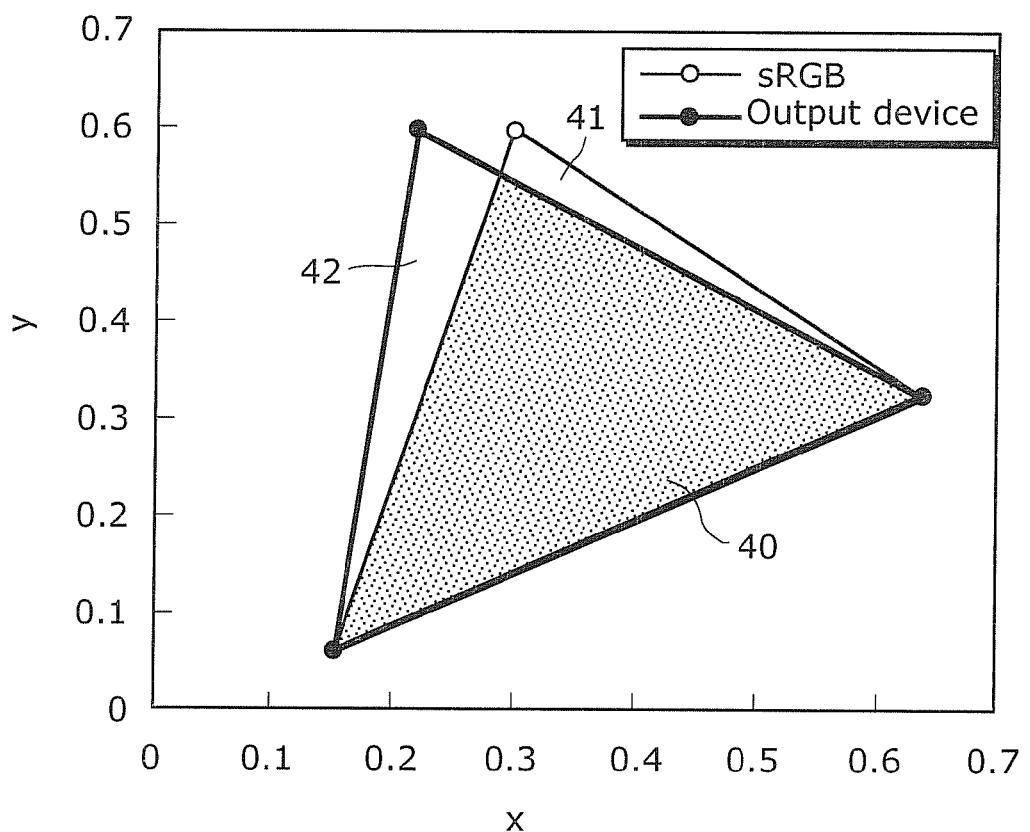
FIG. 25 is a diagram showing an example of the different color gamut standards in the color conversion device according to Embodiment 3 of the present invention.

In other words, in terms of the present embodiment, a color gamut area 40 shown in FIG. 25 is a color gamut area common to the sRGB color gamut and the color gamut of the output device, that is, the first color gamut and the second color gamut. To put it differently, the color gamut area 40 is the color gamut area that is included in a part of the second color gamut overlapping with the first color gamut. Conversely, a color gamut area other than the color gamut area 40 in the first color gamut is a color gamut area 41 that is included in a part of the first color gamut not overlapping with the second color gamut, and a color gamut area other than the color gamut area 40 in the second color gamut is a color gamut area 42 that is included in a part of the second color gamut not overlapping with the first color gamut.

Figure 26:
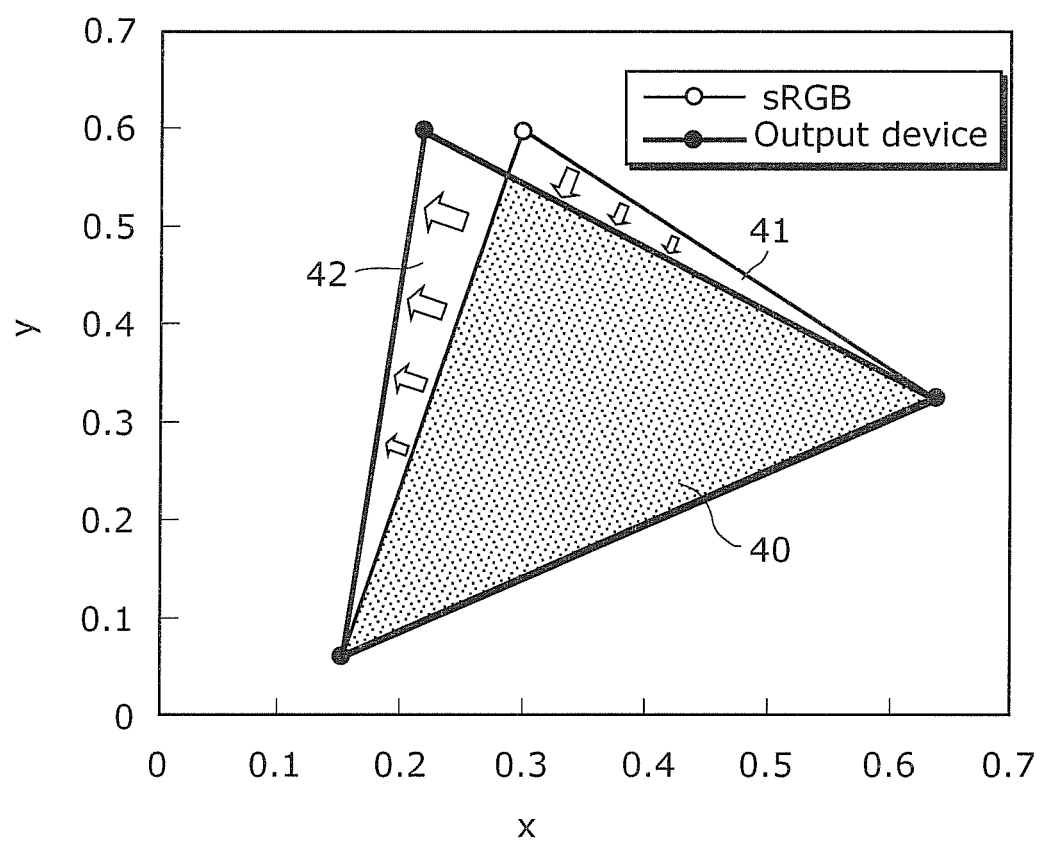
FIG. 26 is a diagram showing an example of the different color gamut standards in the color conversion device according to Embodiment 3 of the present invention.

Thus, it is necessary to perform the color gamut compression or color gamut expansion of the sRGB color data from the first color gamut to the second color gamut. Stated differently, it is necessary to perform the color gamut compression, as shown by inward arrows in FIG. 26, on the sRGB color data in the color gamut area 41 in which the sRGB color gamut is broader than the color gamut of the output device, and to perform, as shown by outward arrows in FIG. 26, the color gamut expansion on the sRGB color data in the color gamut area 42 in which the color gamut of the output device is broader than the sRGB color gamut.

The color data input unit 10 converts the input color data 20 into the input color data 21, and provides the converted input color data 21 to the color gamut area decision unit 15, the first color mapping unit 11, and the second color mapping unit 14.

The color gamut area decision unit 15 decides whether or not the input color data 21 in the sRGB color gamut, which is the above-described first color gamut, is included in the color gamut of the output device, which is the above-described second color gamut. In terms of the present embodiment, it is determined whether or not chromaticity of the above-described input color data 21, for instance, an xy value, is included in the color gamut area 40 common to the sRGB color gamut, which is the first color gamut, and the color gamut of the output device, which is the second color gamut, as shown in FIG. 25. It is to be noted that the color gamut area decision unit 15 converts an RGB value of the input color data 21 into an XYZ value using Expression 6, and calculates the xy value using the converted XYZ value and Expression 10.

Expression 10

$$x = \frac{X}{X+Y+Z}$$ [Math. 10]

$$y = \frac{Y}{X+Y+Z}$$

When the above-described input color data 21 is included in the color gamut of the output device, which is the second color gamut, the color gamut area decision unit 15 provides, to the first color mapping unit 11, an intra-color-gamut identification signal 26 indicating that the color gamut of the input color data 21 is within the second color gamut. Conversely, when the above-described input color data 21 is not included in the color gamut of the output device, which is the second color gamut, the color gamut area decision unit 15 provides, to the first color mapping unit 11, an extra-color-gamut identification signal 27 indicating that the color gamut of the input color data 21 is out of the second color gamut.

The first color mapping unit 11 maps, as color data within the second color gamut, color data provided from the color data input unit 10. At this time, when the first color mapping unit 11 receives, from the above-described color gamut area decision unit 15, the intra-color-gamut identification signal 26 indicating that the color gamut of the input color data 21 is within the second color gamut, the first color mapping unit 11 directly maps the color data in the first color gamut into the second color gamut without causing chromaticity displacement. In addition, when the first color mapping unit 11 receives, from the above-described color gamut area decision unit 15, the extra-color-gamut identification signal 27 indicating that the color gamut of the input color data 21 is out of the second color gamut, the first color mapping unit 11 maps the color data in the first color gamut into a color gamut boundary of the second color gamut.

More specifically, the first color mapping unit 11 temporarily converts the RGB input color data 21 into the device-independent color space, which is the color space independent of the device, for instance, the CIE XYZ or xy chromaticity value, and generates the first converted color data 22 by mapping the chromaticity value as XYZ within the second color gamut or the xy value and inversely converting the mapped XYZ or xy value into the original RGB color data.

When the input color data 21 is RGB data in sRGB format, the first color mapping unit 11 performs the conversion from RGB into XYZ using Expression 6. Furthermore, the first color mapping unit 11 performs the conversion into the xy chromaticity value further using Expression 10. Moreover, the first color mapping unit 11 uses Expressions 11 and 12 for the inverse conversion into the original RGB after the mapping into the second color gamut.

Expression 11

$$X = x \times (Y/y)$$ [Math. 11]

$$Y = Y$$

$$Z = (1 - x - y) \times (Y/y)$$

Expression 12

$$\begin{bmatrix} R \\ G \\ B \end{bmatrix} = \begin{bmatrix} 2.2077 & -0.6997 & -0.3660 \\ -0.9692 & 1.8760 & 0.0416 \\ 0.1534 & -0.4024 & 1.1538 \end{bmatrix} \begin{bmatrix} X \\ Y \\ Z \end{bmatrix}$$ [Math. 12]

The first color mapping unit 11 basically employs the above-described clipping for the mapping in the present embodiment. The color gamut compression by the clipping allows colors reproducible within the color gamut of the output device to be faithfully reproduced. Here, it is necessary to prevent chromaticity of input color data from being displaced as much as possible, for the color such as the human skin color which gives people a feeling of strangeness when its coloration is changed. Consequently, the clipping which allows a color range having not high saturation to be reproduced within the color gamut of the output device and directly reproduces a chromaticity point of the input color data (e.g., a point indicated by a chromaticity value such as xy) is suitable.

In the simplest clipping compression, when, for example, converting into an RGB color gamut, the value of one of R, G, or B is set to be 0 when such value is 0 or lower in Expression 12 in the series of conversions of Expressions 6 and 10 to 12, and the value is set to 1 when the value is 1 or higher. It is to be noted that for the clipping, a method for compressing an out-of-color-gamut color that cannot be reproduced in a color gamut such that a color difference is minimum may be employed, or a color of a neighborhood in value or saturation may be selected. In this case, the first color mapping unit 11 converts an XYZ value into a chromaticity value in an L*a*b* space using Expressions 3 and 4, and then calculates value (L), saturation (C), and hue (H). Next, the first color mapping unit 11 performs the clipping based on the color difference, value, or saturation, using the calculated values of the value (L), the saturation (C), and the hue (H).

The first converted color data 22 mapped by the first color mapping unit 11 is provided to the color mixing unit 12.

The second color mapping unit 14 generates the second converted color data 25 by mapping the color data in the first color gamut into the second color gamut, and the color data in the first color gamut is the color data in the second color gamut. Alternatively, the second color mapping unit 14 generates the second converted color data 25 by specific-mapping the color data in the first color gamut into predetermined color data in the second color gamut.

When the color data in the first color gamut is the color data in the second color gamut and the second color mapping unit 14 maps the color data in the first color gamut into the color data in the second color gamut, it means that the color data in the first color gamut is substantially used as the color data in the second color gamut. In other words, the input color data 21 and the second converted color data 25 are the same as each other. Thus, the sRGB input color data 21 in the first color gamut is directly provided, to the color mixing unit 12, as the color data in the color gamut of the output device, which is the second color gamut, that is, the second converted color data 25 dependent on the color gamut of the device.

On the other hand, when the second color mapping unit 14 specific-maps the color data in the first color gamut into the predetermined color data in the second color gamut, the second color mapping unit 14 may generate the second converted color data 25 by (i) converting the input color data 21, which is the RGB data, using Expressions 6 and 10, (ii) mapping the input color data 21 into a predetermined xy chromaticity value, and (iii) inversely converting the xy chromaticity value into the RGB data using Expressions 11 and 12.

The color mixing unit 12 generates the color data 23 by mixing the first converted color data 22 (R1, G1, B1) mapped by the first color mapping unit 11 and the second converted color data 25 (R2, G2, B2) mapped by the second color mapping unit 14.

Here, the color mixing unit 12 mixes the first converted color data 22 and the second converted color data 25 so that a proportion of the first converted color data 22 (R1, G1, B1) whose chromaticity of the input color data is not displaced is as high as possible for the color such as the human skin color which gives people a feeling of strangeness when its coloration is changed. In addition, the color mixing unit 12 mixes the First converted color data 22 and the second converted color data 25 so that a proportion of the second converted color data 25 (R2, G2, B2) is as high as possible in order to ensure a color reproduction range for the color at the boundary of the second color gamut and in its vicinity.

It is to be noted that as a specific mixing method, for instance, when the second converted color data 25 (R2, G2, B2) is the same as the input color data 21 (R, G, B), the color mixing unit 12 first calculates hue (H), saturation (S), and value (V) from the second converted color data 25 (R2, G2, B2). For example, the color mixing unit 12 calculates the hue (H), the saturation (S), and the value (V) using either Expression 5 or Expressions 3 and 4 after temporarily converting the input color data 21 into XYZ.

Figure 27:
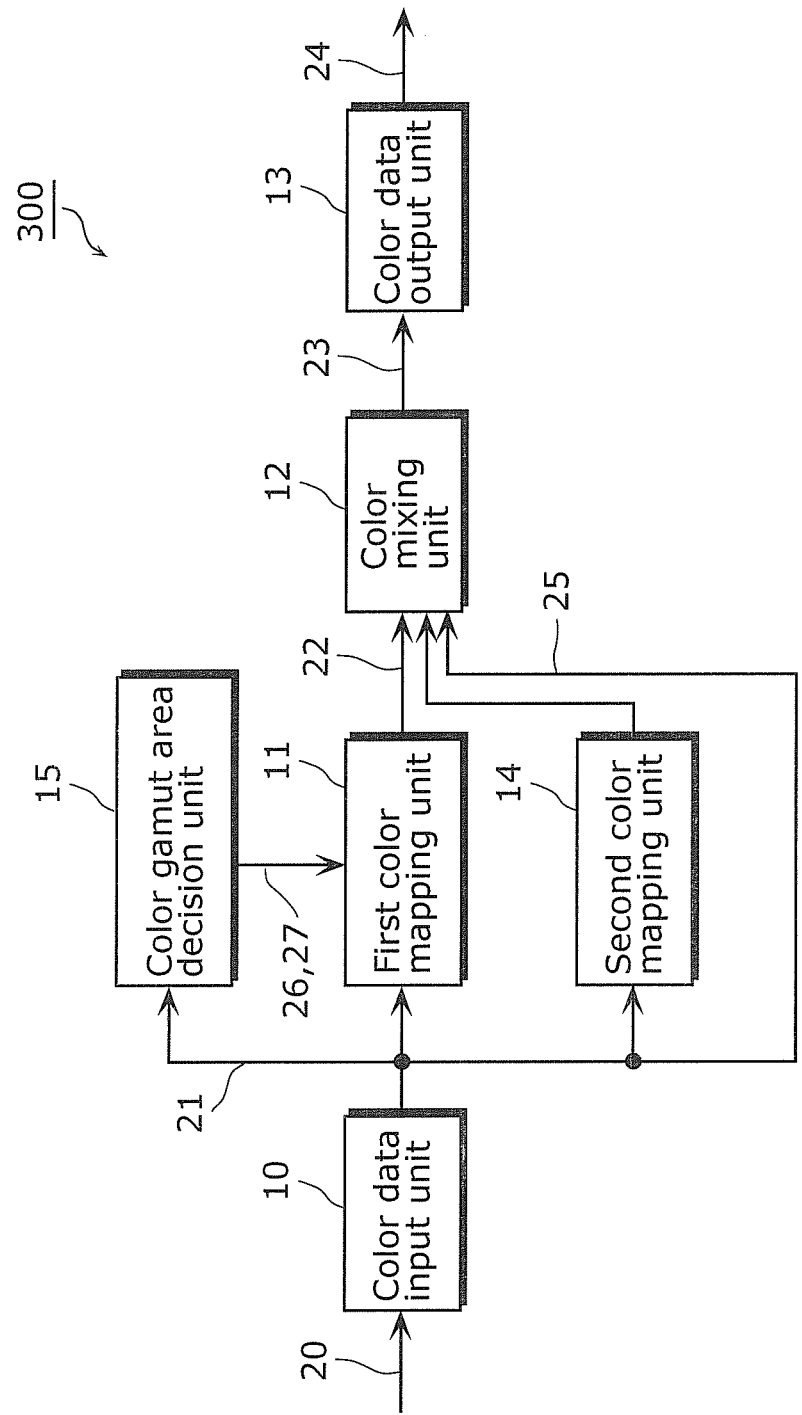
FIG. 27 is a block diagram showing a basic configuration of a modification of the color conversion device according to Embodiment 3 of the present invention.

It is to be noted that when the second converted color data 25 (R2, G2, B2) is different from the input color data 21 (R, G, B), that is, when the second color mapping unit 14 performs the above-described specific mapping, as shown in FIG. 27, the color mixing unit 12 acquires the input color data 21 from the color data input unit 10, and calculates the hue (H), the saturation (S), and the value (V) using the input color data 21 (R, G, B).

Next, a preservation color range and a compression or expansion color range are separated using the hue (H), the saturation (S), and the value (L). Furthermore, the color mixing unit 12 changes, for each of the preservation color range and the compression color range, a mixing ratio between the first converted color data 22 (R1, G1, B1) and the second converted color data 25 (R2, G2, B2) based on values of the hue (H), the saturation (S), and the value (L), and mixes the first converted color data 22 and the second converted color data 25.

Here, the mixing ratio r differs depending on the hue (H), the saturation (S), and the value (V). For instance, when the sRGB color gamut is converted into the color gamut of the output device, hue in a green (G) color region is displaced to cyan, and a color gamut is broadened in cyan (C) and is narrowed in yellow (Y). Here, the mixing ratio of the second converted color data 25 (R2, G2, B2) is set higher in a color gamut area of hues of green (G), yellow (Y), and cyan (C) so that the color reproducible range can be utilized as much as possible.

Furthermore, for the saturation (S), the mixing ratio of the input color data 21 (RGB) is set higher as saturations for all hues increase. At this time, the setting of the mixing ratio is adjusted based on the hue and the value.

Moreover, for the value (V), the mixing ratio of the input color data 21 (RGB) is set higher when the value is relatively high. At this time, the setting of the mixing ratio is adjusted based on the saturation and the hue.

Furthermore, the mixing ratio r is basically set based on a difference in area (or ratio) between the first color gamut and the second color gamut. When the first color gamut is broader than the second color gamut and is converted into the second color gamut through color gamut compression, the mixing ratio of the input color data 21 (RGB) is set higher as the first color gamut is greater in area than the second color gamut. However, the mixing ratio is adjusted based on the hue (H), the saturation (S), and the value (V) because a difference in area (or ratio) between two color gamuts is not uniform but often different depending on the hue (H), the saturation (S), and the value (V).

Moreover, as in Embodiments 1 and 2, in each case of performing the color gamut compression or the color gamut expansion, the color mixing unit 12 sets the mixing ratio of the second converted color data 25 (R2, G2, B2) higher with an increase in the difference in area between the two color gamuts.

It is to be noted that although the above-described mixing ratio is basically observed when the second color mapping unit 14 performs the above-described specific mapping, the color mixing unit 12 sets the mixing ratio of the second converted color data 25 (R2, G2, B2) higher for a mapping range especially set by the specific mapping.

Figure 29:
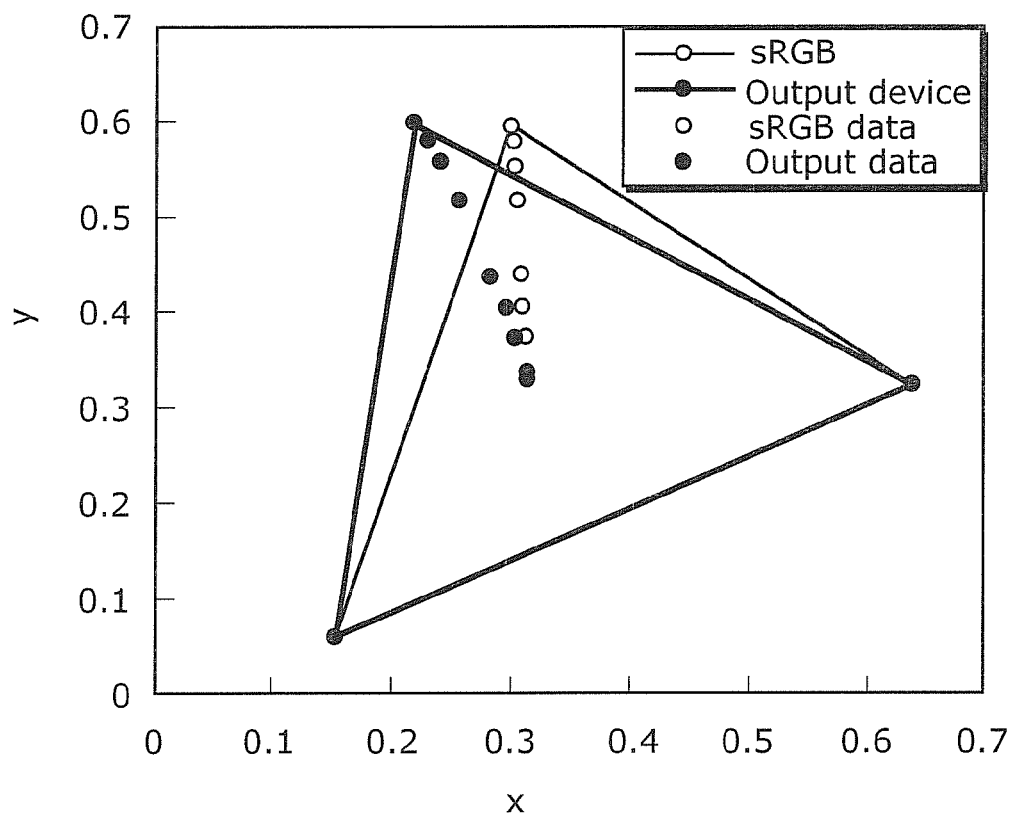
FIG. 29 is a diagram showing an example of color gamut conversion by the color conversion device according to Embodiment 3 of the present invention.

Next, each of FIGS. 28A, 28B, and 29 shows an example of (i) the color data 23 actually generated by mixing the first converted color data 22 (R1, G1, B1) and the second converted color data 25 (R2, G2, B2) and (ii) an xy chromaticity value of the same. Here, the following describes a case where the second converted color data 25 (R2, G2, B2) and the input color data 21 (R, G, B) are the same as each other. In addition, it is assumed that the input color data 20 (R, G, B) and a Yxy chromaticity value 30 of the same are the same as those in FIG. 10A.

FIG. 28A is a diagram showing a value of the first converted color data 22 (R1, G1, B1) that is converted to an 8-bit RGB value ranging from 0 to 255 by inversely converting the xy value (Yxy chromaticity value 30) shown in FIG. 10A into RGB of the output device as the second color gamut and further performing gamma conversion on the inversely-converted value, using Expressions 11 and 12. However, the RGB value shown in FIG. 28A is a value that is clipped to 0 when a RGB value is equal to or below 0 in Expression 12 and that is clipped to 1 when the RGB value is equal to or above 1 in Expression 12. FIG. 28B is a diagram showing an example of (i) a RGB value of the color data 23 obtained by mixing, at the mixing ratio compliant with above-described setting, the second converted color data 25 (R2, G2, B2), that is, the input color data 20 (R, G, B) shown in FIG. 10A, and the first converted color data 22 (R1, G1, B1) shown in FIG. 28A and (ii) a Yxy chromaticity value 31 of the same.

FIG. 29 is a diagram showing an xy chromaticity value of sRGB data in the first color gamut which is the input color data 20 and an xy chromaticity value of the color data 23 (color data 24) which is color-mixed by the color conversion device 300. In FIG. 29, a white dot indicates the xy value (the Yxy chromaticity value 30 in FIG. 10A) of the sRGB data in the first color gamut, and a black dot indicates the color data 23 (the Yxy chromaticity value 31 in FIG. 28B) which is obtained by converting the sRGB data in the first color gamut into the color gamut of the output device which is the second color gamut. As shown in FIG. 29, a color reproduction range of green can be broadened as much as possible, a chromaticity value in the vicinity of white close to the human skin color is hardly displaced, relative color relationships remain unchanged, and continuity of color gradation is maintained.

Furthermore, each of FIGS. 30A to 30C and 31 shows another example of the color data 23 and an xy chromaticity value of the same.

FIG. 30A is a diagram showing an 8-bit data value of sRBG in the first color gamut which is the input color data 20 (R, G, B), and an xy chromaticity value 32 obtained by performing inverse gamma conversion on the data value and converting the data value into an xy value using Expressions 6 and 10. FIG. 30B is a diagram showing a value of the first converted color data 22 (R1, G1, B1) that is converted to an 8-bit RGB value ranging from 0 to 255 by inversely converting the xy chromaticity value 32 into RGB of the output device as the second color gamut and performing gamma conversion on the inversely-converted value, using Expressions 11 and 12. However, the value shown in FIG. 30B is a value that is clipped to 0 when a RGB value is equal to or below 0 in Expression 12 and that is clipped to 1 when the RGB value is equal to or above 1 in Expression 12. FIG. 30C is a diagram showing an example of (i) an RGB value of the color data 23 obtained by mixing, at the mixing ratio compliant with above-described setting, the second converted color data 25 (R2, G2, B2), that is, the input color data 20 (R, G, B) shown in FIG. 30A, and the first converted color data 22 (R1, G1, B1) shown in FIG. 30B and (ii) an xy chromaticity value 33 of the same.

The sRGB value which is the input color data 20 in FIG. 30A is a value obtained by extracting sample data of the human skin color and data of a color range of yellow (Y).

Figure 31:
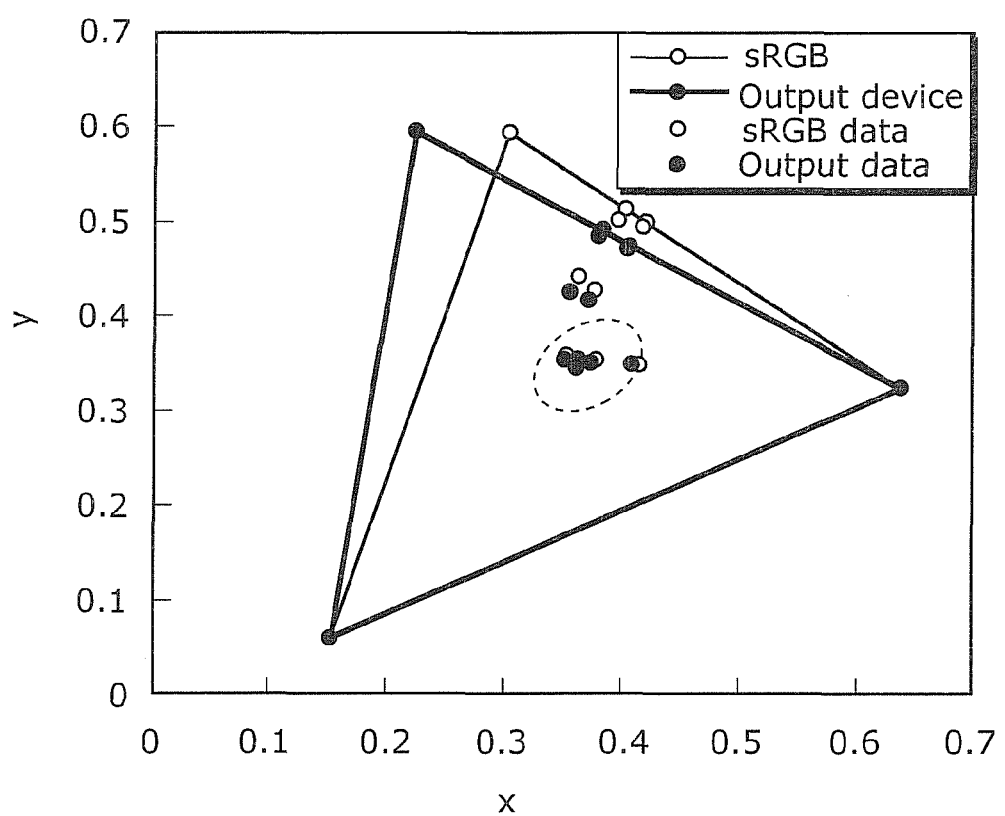
FIG. 31 is a diagram showing an example of color gamut conversion by the color conversion device according to Embodiment 3 of the present invention.

FIG. 31 is a diagram showing an xy chromaticity value of sRGB data in the first color gamut which is the input color data 20 shown in FIG. 30A and an xy chromaticity value of the color data 23 (color data 24) which is color-mixed by the color conversion device 300. In FIG. 31, a white dot indicates the xy value (the xy chromaticity value 32 in FIG. 30A) of the sRGB data in the first color gamut, and a black dot indicates the xy value (the xy chromaticity value in FIG. 30C) of the color data 23 which is obtained by converting the sRGB data in the first color gamut into the color gamut of the output device which is the second color gamut. As shown in FIG. 31, displacement of chromaticity of the sample data of the human skin color defined by a broken line is significantly small before and after conversion. In addition, a relative color relationship of the color range of yellow (Y) remains unchanged, and continuity of color gradation is maintained.

The color data output unit 13 outputs the color data generated by the color mixing unit 12. An output destination is an output device such as a display, projector, or printer.

It is to be noted that although the above-described embodiment has described the color conversion from the sRGB color gamut into the color gamut of the output device, it goes without saying that it is possible to perform the color conversion from not only a specific color gamut such as a standard but also a predetermined color gamut of the input color data or input device into a predetermined color gamut of the output device.

As described above, when the first color gamut of the input color data 20 cannot be completely covered by the second color gamut of the color data 24 and even when the second color gamut of the color data 24 cannot be completely covered by the first color gamut of the input color data 20, the color conversion device 300 according to Embodiment 3 of the present invention makes it possible to maintain the continuity of the color gradation without changing the coloration such as the human skin color or the color relationships in the color gamut of the output device.

The following describes a flow of color conversion processing by the color conversion device 300.

Figure 32:
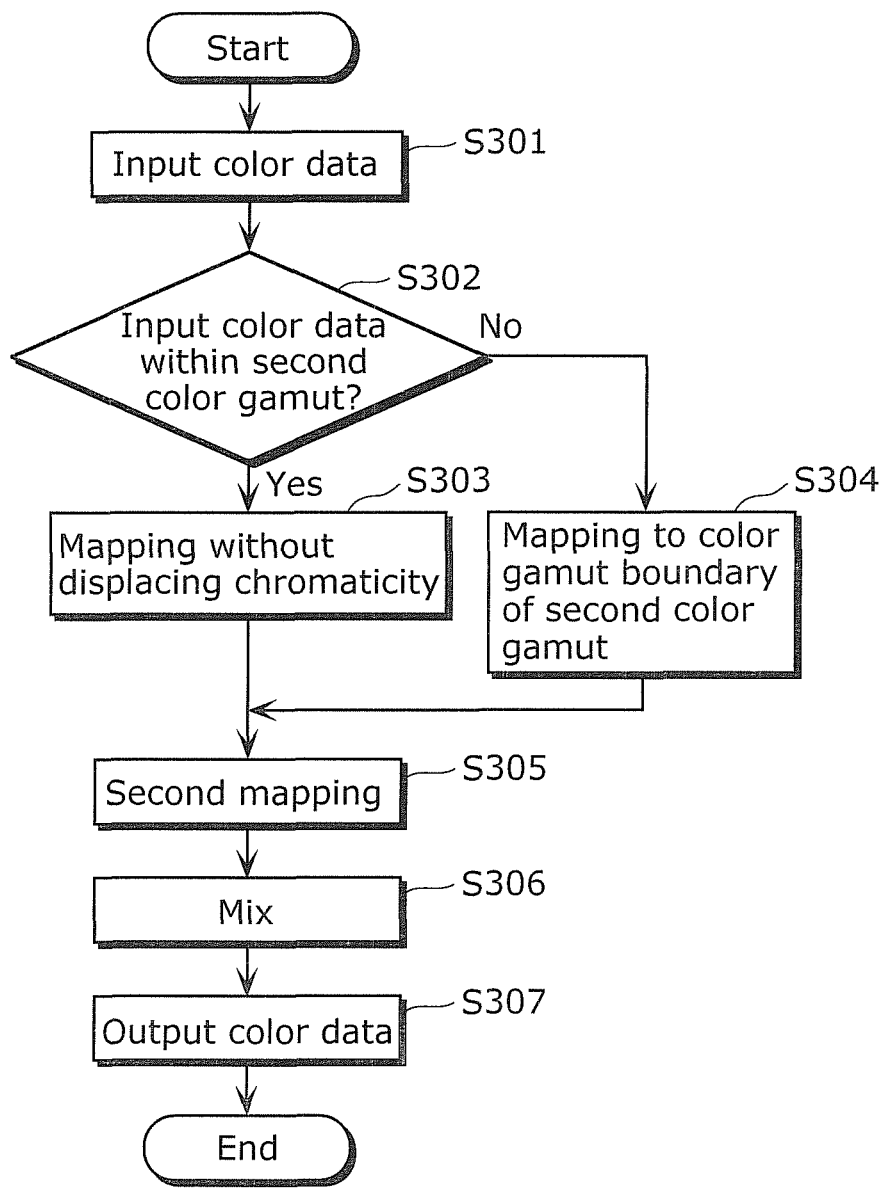
FIG. 32 is a flow chart showing a flow of color conversion processing by the color conversion device according to Embodiment 3 of the present invention.

FIG. 32 is a flow chart showing a flow of color conversion processing by the color conversion device 300.

As shown in FIG. 32, first, the color data input unit 10 inputs input color data 20 from the outside (S301). In addition, the color data input unit 10 converts the input color data 20 into linear input color data 21.

Next, the color gamut area decision unit 15 decides whether or not the input color data 21 is included in the second color gamut (S302).

When the input color data 21 is included in the second color gamut (Yes in S302), the first color mapping unit 11 generates first converted color data 22 by mapping, into the second color gamut, the input color data 21 converted by the color data input unit 10 without causing chromaticity displacement and with the input color data 21 being in the first color gamut (S303).

On the other hand, when the input color data 21 is not included in the second color gamut (No in S302), the first color mapping unit 11 generates the first converted color data 22 by mapping, into a color gamut boundary of the second color gamut, the input color data 21 converted by the color data input unit 10 (S304).

After the step S303 or the step S304, the second color mapping unit 14 generates second converted color data 25 by mapping the input color data 21, and the input color data 21 converted by the color data input unit 10 is color data within a color gamut of color data 24 (S305).

Next, the color mixing unit 12 generates color data 23 by mixing the first converted color data 22 and the second converted color data 25 (S306).

Next, the color data output unit 13 outputs, to an output device, the color data 23 as the color data 24 (S307).

It is to be noted that the steps S302 to S304 and the step S305 may be in any order. For instance, the step S305 may be performed before the step S302, and the step S305 and any of the steps S302 to S304 may be performed simultaneously.

In addition, as with the modification (FIG. 12) of the color conversion device 100 according to Embodiment 1, the color data output unit 13 may perform conversion (gamma conversion) so that the first converted color data 22 and the second converted color data 25 can be displayed by the output device, and the color mixing unit 12 may mix the converted two data.

The functions of the color conversion devices 100, 200, and 300 according to Embodiments 1 to 3 can be realized through, for example, execution of a program by a device including an arithmetic unit and a memory.

For example, color data such as broadcast video or images recorded on a recording medium (BD (Blu-ray Disc), DVD (Digital Versatile Disc), HDD (Hard Disk Drive), CD-ROM (Compact Disc Read Only Memory), or memory card) is inputted to the above-described device through an interface such as SDI (Serial Digital Interface), DVI (Digital Visual Interface), HDMI (High-Definition Multimedia Interface), USB (Universal Serial Bus), or IEEE1394. The inputted color data is temporarily recorded in a memory buffer included in the device. The recorded color data is sequentially transmitted to the arithmetic unit (e.g., CPU), and the color conversion described in the above embodiments is performed along with the program executed by the arithmetic unit. The color-converted color data is temporarily accumulated in an output memory buffer, and is outputted in synchronization with output (or display) of an output device (e.g., display).

Moreover, the present invention can be realized by using an LUT (lookup table) indicating a correspondence relationship between the input color data 20 and the color data 24 which is calculated through characteristic steps of the color conversion device 100, 200, or 300. In other words, the present invention may be realized as a color conversion table indicating the correspondence relationship between the input color data 20 and the color data 24. More specifically, the color conversion table indicates, for instance, the correspondence relationship between the input color data 20 shown in FIG. 7A and the color data 23 (color data 24) shown in FIG. 7C.

Furthermore, the present invention may be realized as a method for creating a color conversion table. More specifically, the method for creating a color conversion table according to the present invention includes: the characteristic steps of the color conversion device 100, 200, or 300; and creating a color conversion table in which the color data 24 calculated through such steps corresponds to the input color data 20.

As a matter of course, the program and the LUT can be recorded on either an internal or external memory (RAM) of either the color conversion device 100, 200, or 300 or the arithmetic unit, and can be recorded on an external recording medium such as HDD, DVD, or a nonvolatile memory card.

It is to be noted that the color conversion program causes the arithmetic unit to perform inverse gamma conversion and gamma conversion on the input color data 20 and the color data 24, a matrix operation between the two different color gamuts, conversion from RGB to HSV (hue, saturation, value), a color mapping operation, and a color mixing operation. These conversion methods and operations are performed by the arithmetic unit in the procedure described by the embodiments.

Moreover, the color conversion LUT (color conversion look up table) is, for example, a 3D LUT including RGB which maps the RGB input color data 20 into RGB data which is the color data 24. The LUT is for mapping a three-dimensional color space value of the input color data 20 (RGB) into a three-dimensional space of the color data 24 (RGB) which is the color mixing result. The color conversion LUT is generated by setting the input color data 20 (RGB) based on the difference in area (ratio) between the two color gamuts corresponding to the mixing ratios of the two color data described in the embodiments, the hue (H), the saturation (S), or the value (V), and the resultant RGB value of the color data is set as data of an RGB lattice point of the color conversion LUT. The 3D LUT includes, for instance, RGB lattice points of 16 (R)×16 (G)×16 (B), 32 (R)×32 (G)×32 (B), or 64 (R)×64 (G)×64 (B). The number of RGB lattice points may be determined by accuracy required for color conversion. Data of each lattice point is, for example, 8-bit data, 10-bit data, or the like.

Furthermore, when the number of the RGB lattice points is small, an interpolation operation may be incorporated so that color discontinuity does not occur in values between the RGB lattice points.

Here, a configuration in which 3D LUTs including RGB are employed is described in detail with reference to the drawing.

Figure 33:
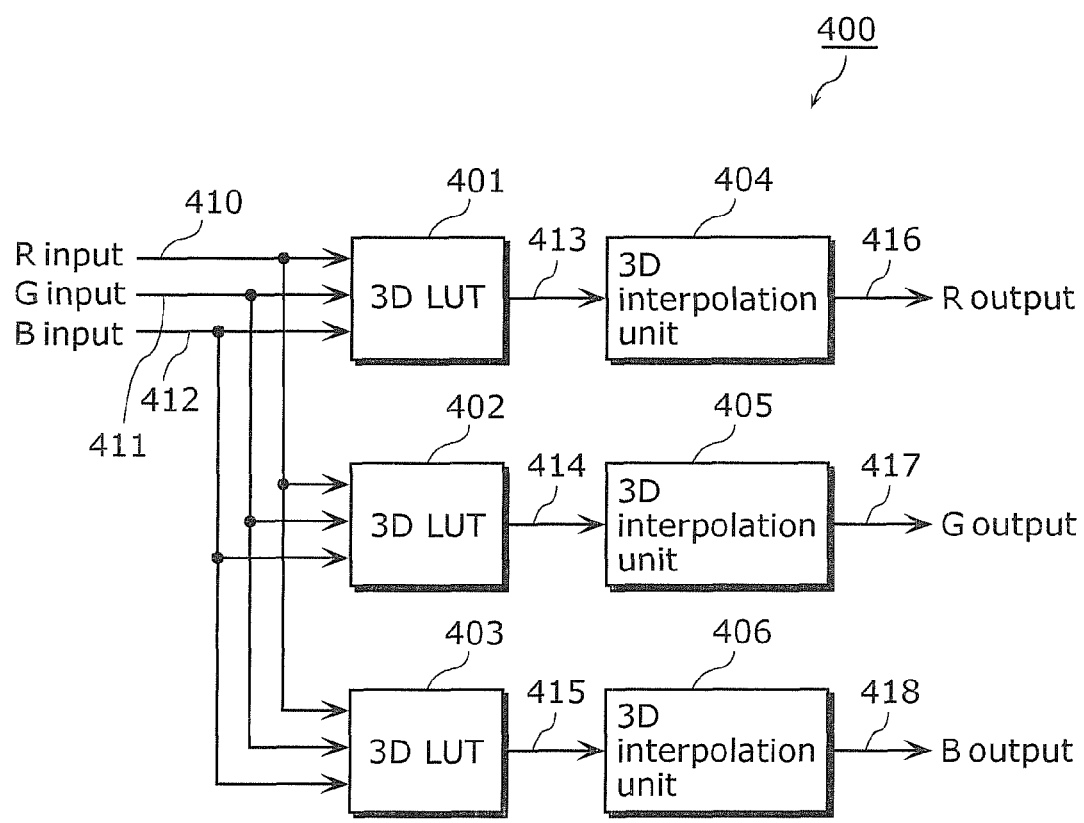
FIG. 33 is a diagram showing a configuration of a color conversion device including a 3D LUT and a 3D interpolation unit according to the present embodiment.

FIG. 33 is a diagram showing a configuration of a color conversion device 400 in which processing from the input of the color data input unit 10 to the output of the color data output unit 13 shown in FIG. 1 is configured by 3D LUTs and 3D interpolation units.

An R signal 410, a G signal 411, and a B signal 412 included in the input color data 20 to be inputted are inputted to three 3D LUTs 401, 402, and 403. The 3D LUTs 401, 402, and 403 output data 413, data 414, and data 415 that correspond to 8 points of a lattice cube of an LUT including a position of (R, G, B), by converting the R signal 410, the G signal 411, and the B signal 412, respectively.

The data 413, the data 414, and the data 415 are outputted to the 3D interpolation units 404, 405, and 406, respectively. The 3D interpolation units 404, 405, and 406 use the data 413, the data 414, and the data 415 as original data for interpolating data, and generate an R signal 416, a G signal 417, and a B signal 418.

When an RGB lattice point is, for instance, 16×16×16, the 3D interpolation units 404, 405, and 406 determine which lattice point is to be used, based on upper 4 bits of the inputted RGB, and determine a coefficient for the interpolation operation based on lower 4 bits. The 3D interpolation units 404, 405, and 406 three-dimensionally perform the interpolation operation, and perform, for each of R, G, and B, interpolation at each of axes of R, G, and B.

When the RGB lattice point is 16×16×16 and the RGB data consists of 8 bits, a 16×16×16 LUT is necessary for each of R, G, and B. Thus, when the LUT is configured using the memory, 16×16×16×3×8 bits are necessary as memory capacity to be used.

In addition, processing from the output of the color data input unit 10 to the input of the color data output unit 13 shown in FIG. 1 can be configured by the 3D LUTs and the 3D interpolation units.

Moreover, another specific configuration is described with reference to the drawing.

Figure 34:
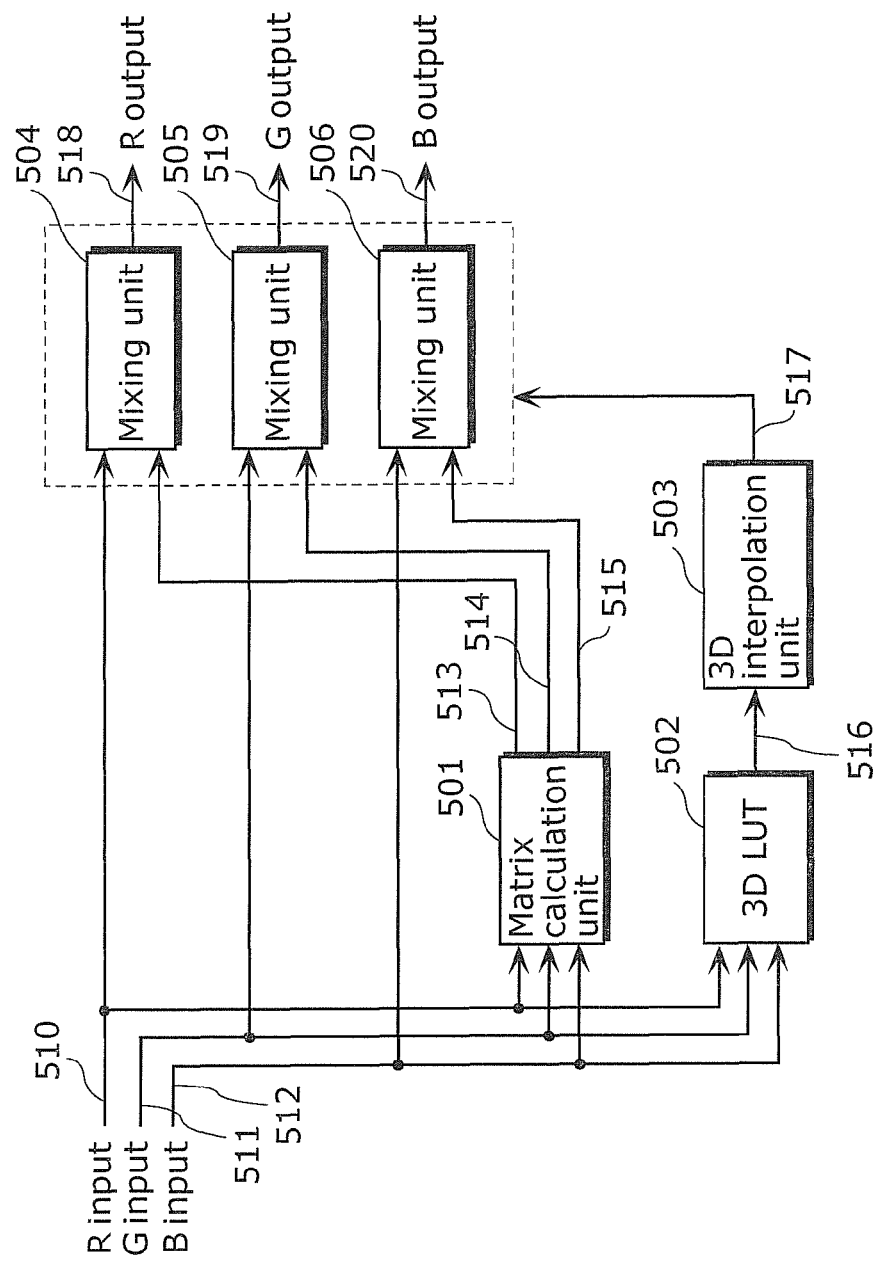
FIG. 34 is a diagram showing a configuration of a color conversion device including the 3D LUT which provides a mixing ratio, according to the present embodiment of the present invention.

FIG. 34 is a diagram showing a configuration of a color conversion device 500 including: a 3D LUT which outputs a mixing ratio; and a mixing unit which mixes two types of inputted color data according to the mixing ratio.

An R signal 510, a G signal 511, and a B signal 512 included in the input color data 20 to be inputted are respectively inputted to mixing units 504, 505, and 506 each of which is associated with a corresponding one of R, G, and B. In addition, the R signal 510, the G signal 511, and the B signal 512 are inputted to a matrix operation unit 501 and a 3D LUT 502.

The matrix operation unit 501 corresponds to the first color mapping unit 11 shown in FIG. 1, and generates an R signal 513, a G signal 514, and a B signal 515 by performing a matrix operation which corresponds to a combination of Expressions 1 and 2.

The 3D LUT 502 generates mixing ratio data 516 which corresponds to the mixing ratio r corresponding to R, G, and B. A 3D interpolation unit 503 generates mixing ratio data

517 by performing an interpolation operation on the mixing ratio data 516. It is to be noted that the operations of the 3D LUT 502 and the 3D interpolation unit 503 are the same as those of the 3D LUT 401 and the 3D interpolation unit 404 in the description of FIG. 33.

Moreover, the mixing unit 504 generates an R signal 518 by mixing the R signal 510 and the R signal 513 at the mixing ratio r indicated by the mixing ratio data 517. The mixing unit 505 generates a G signal 519 by mixing the G signal 511 and the G signal 514 at the mixing ratio r indicated by the mixing ratio data 517. The mixing unit 506 generates a B signal 520 by mixing the B signal 512 and the B signal 515 at the mixing ratio r indicated by the mixing ratio data 517.

Here, although LUT data is data corresponding to R, G, and B signals in the 3D LUTs 401, 402, and 403, LUT data is data of the mixing ratio r and corresponds to a coefficient in the 3D LUT 502. In addition, since there is a correlation between input data and color-mapped data, influence of the mixing ratio r on mixed RGB data is smaller than influence when RGB data itself is changed. As a result, accuracy of the mixing ratio r may be lower than that of the RGB data itself, though the accuracy of the mixing ratio r depends on a difference in color gamut before and after conversion through color mapping. For instance, even when bits of the mixing ratio r are reduced by few bits (e.g., 5 bits) while the RGB data consists of 8 bits, it is possible to set output data to be at an equivalent level.

One 16×16×16 LUT is sufficient when an RGB lattice point is 16×16×16 and data consists of 8 bits, and, assuming that the number of bits can be 5, 16×16×16×5 bits×1 is necessary as memory capacity to be used when the LUT is configured using the memory.

Consequently, in comparison with the configuration of the color conversion device 400 shown in FIG. 33, the matrix operation unit 501 needs adding to the color conversion device 500, but it is possible to reduce capacity required for the LUT to approximately ⅕. Thus, when the color conversion device 500 is implemented by hardware, it is possible to reduce an overall size of the color conversion device 500.

Furthermore, when characteristics are changed by, for example, replacing a display output device, a change of the LUT is required for the color conversion device 400 shown in FIG. 33, whereas setting of the matrix operation unit 501 may be only changed in the color conversion device 500 shown in FIG. 34 because each of the matrix operation unit 501 and the LUT has a different configuration. In other words, it is easy to change the characteristics in the color conversion device 500.

Moreover, when the color conversion device corresponds to display output devices or it is desired that the color conversion device has matrix operation characteristics, measures such as LUT data items being held in, for instance, ROM are required for the color conversion device 400 shown in FIG. 33, whereas nine coefficient data items may be grouped into one set and sets of the coefficient data items need only be held in the color conversion device 500 shown in FIG. 34.

Furthermore, part or all of the functions of the color conversion devices 100, 200, and 300 may be achieved as LSIs which are integrated circuits. These LSIs may be integrated into individual chips, or into a single chip so as to include part or all of the LSIs. Moreover, the present invention may be realized as a color conversion device which achieves input and output characteristics equivalent to those of the color conversion devices 100, 200, 300, by referring to a color conversion LUT (color conversion table), or as a semiconductor integrated circuit. More specifically, the color conversion device includes: the color conversion table; and a conversion unit which converts the input color data 20 into the color data 24, using the color conversion table. In addition, the present invention may be realized as a color conversion device which achieves color conversion by referring to a color conversion table recorded on a recording medium, or as a semiconductor integrated circuit. Furthermore, as stated above, when the different color conversion table is generated for each color signal component of the RGB signal included in the input color data 20, the conversion unit converts the input color data 20 into the color data 24, using the color conversion table generated for each color signal component of the RGB signal included in the input color data 20. It is to be noted that here, although an integrated circuit is referred to as an LSI, it may also be referred to as an IC, a system LSI, a super LSI, or an ultra LSI depending on the degree of integration.

Moreover, a circuit integration method is not limited to the LSI, and may be achieved by a dedicated circuit or a general-purpose processor. Field Programmable Gate Array (FPGA) that can be programmed after the LSI is manufactured or a reconfigurable processor that allows reconfiguration of the connection and setting of circuit cells in the LSI may be used.

Additionally, if a new circuit integration technique is introduced in place of the LSI following development in semiconductor technology or other derivative technology, it is obvious that such technique may be used for integrating functional blocks. Application of biotechnology is one such possibility.

Furthermore, at least part of the functions of the color conversion devices 100, 200, 300 according to Embodiments 1 to 3 and the modifications of the same may be combined.

The present invention can be applied to color conversion devices which are included as CMSs (color management systems) in products such as displays, projectors, printers, or digital cameras and which make it possible to enhance color reproducibility through color gamut conversion or the like. In addition, the present invention can be applied to color conversion methods, color conversion programs, color conversion tables, methods for creating a color conversion table, color conversion table recording media, and color conversion integrated circuits.

The invention claimed is:

1. A color conversion device comprising:
an obtaining unit configured to obtain input color data represented by a first color gamut;
a color mapping unit configured to generate, from the input color data, converted color data that is represented by a second color gamut and for which a chromaticity point of the input color data is maintained, the second color gamut being broader than the first color gamut;
a color mixing unit configured to generate mixed color data by mixing, while changing a mixing ratio depending on a color, the generated converted color data and the obtained input color data on which color conversion is not performed; and
an output unit configured to output the mixed color data to an external device.

2. The color conversion device according to claim 1,
wherein the color mixing unit is configured to (1) set a mixing ratio of the converted color data from among the input color data and the converted color data, to be higher for at least color data representing human skin color, and (2) set a mixing ratio of the input color data from among the input color data and the converted color data, to be higher for at least color data representing a color at a boundary and in a vicinity of a color gamut that the external device is capable of representing.

3. The color conversion device according to claim 1,
wherein the color mixing unit is configured to set the mixing ratio based on a difference in size between the first color gamut and the second color gamut.

4. The color conversion device according to claim 2,
wherein the color mixing unit is configured to set the mixing ratio to be higher as a difference in size between the first color gamut and the second color gamut is greater.

5. The color conversion device according to claim 1,
wherein the color mixing unit is configured to set a mixing ratio of the input color data and a mixing ratio of the converted color data for each of hues set in the input color data and the converted color data.

6. The color conversion device according to claim 1,
wherein the color mixing unit is configured to set a mixing ratio of the input color data to be higher for part of the input color data and the converted color data, the part having high saturation.

* * * * *